Oct. 12, 1948.  E. D. BEACHLER  2,451,147
ROTATING TOOL LATHE
Filed April 21, 1944  10 Sheets-Sheet 4

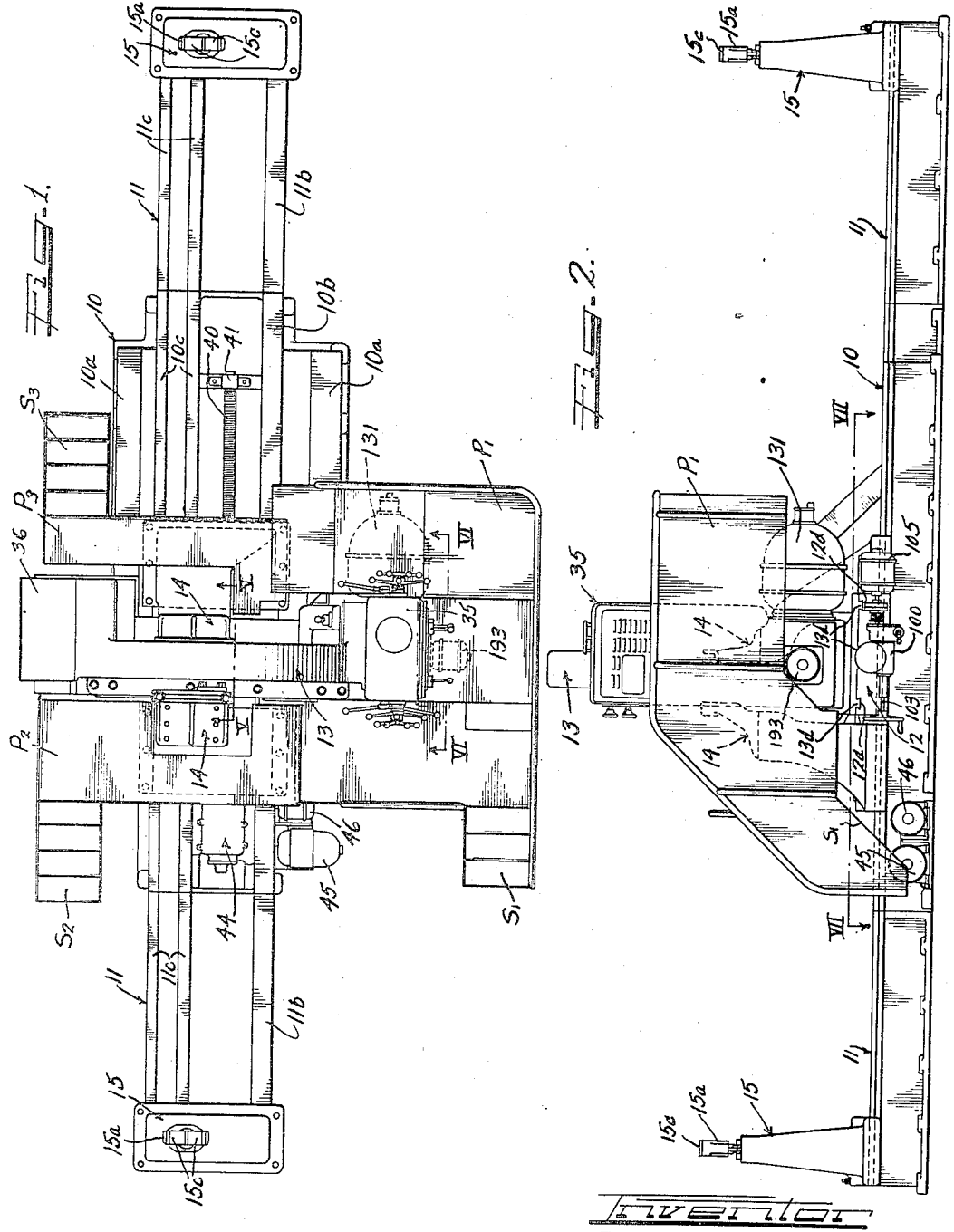

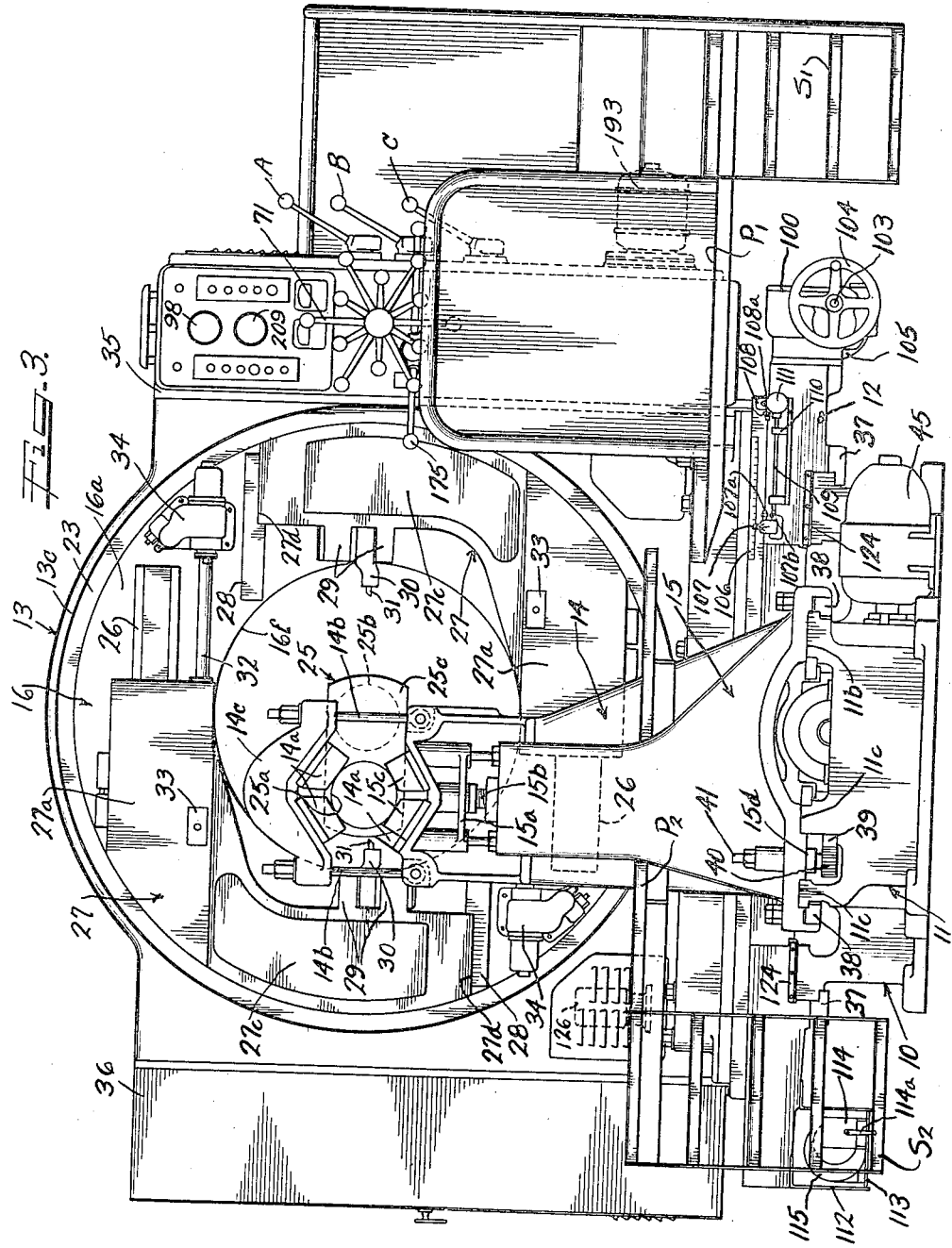

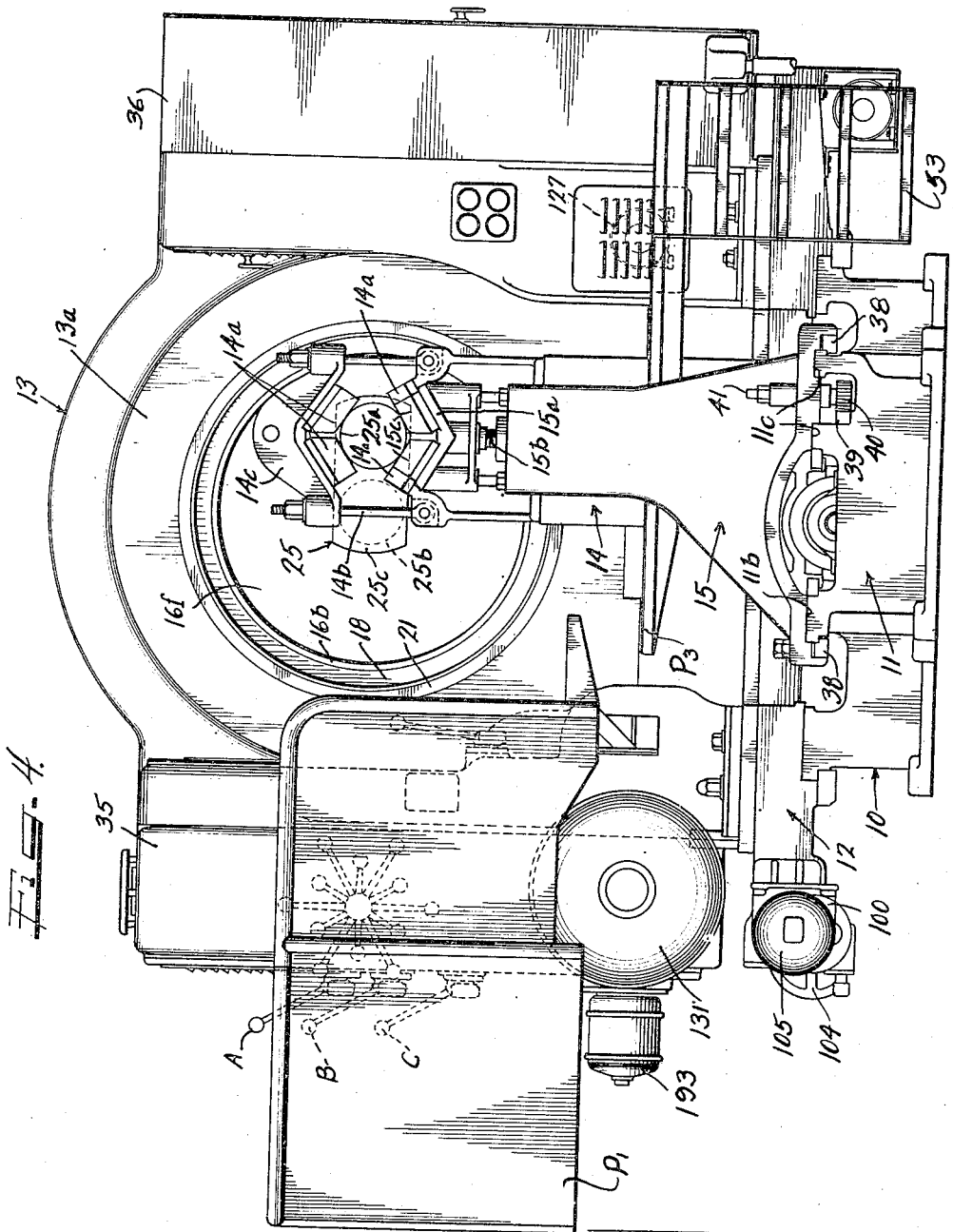

Inventor
EDWARD D. BEACHLER.
By Charles W. Hill, Attys.

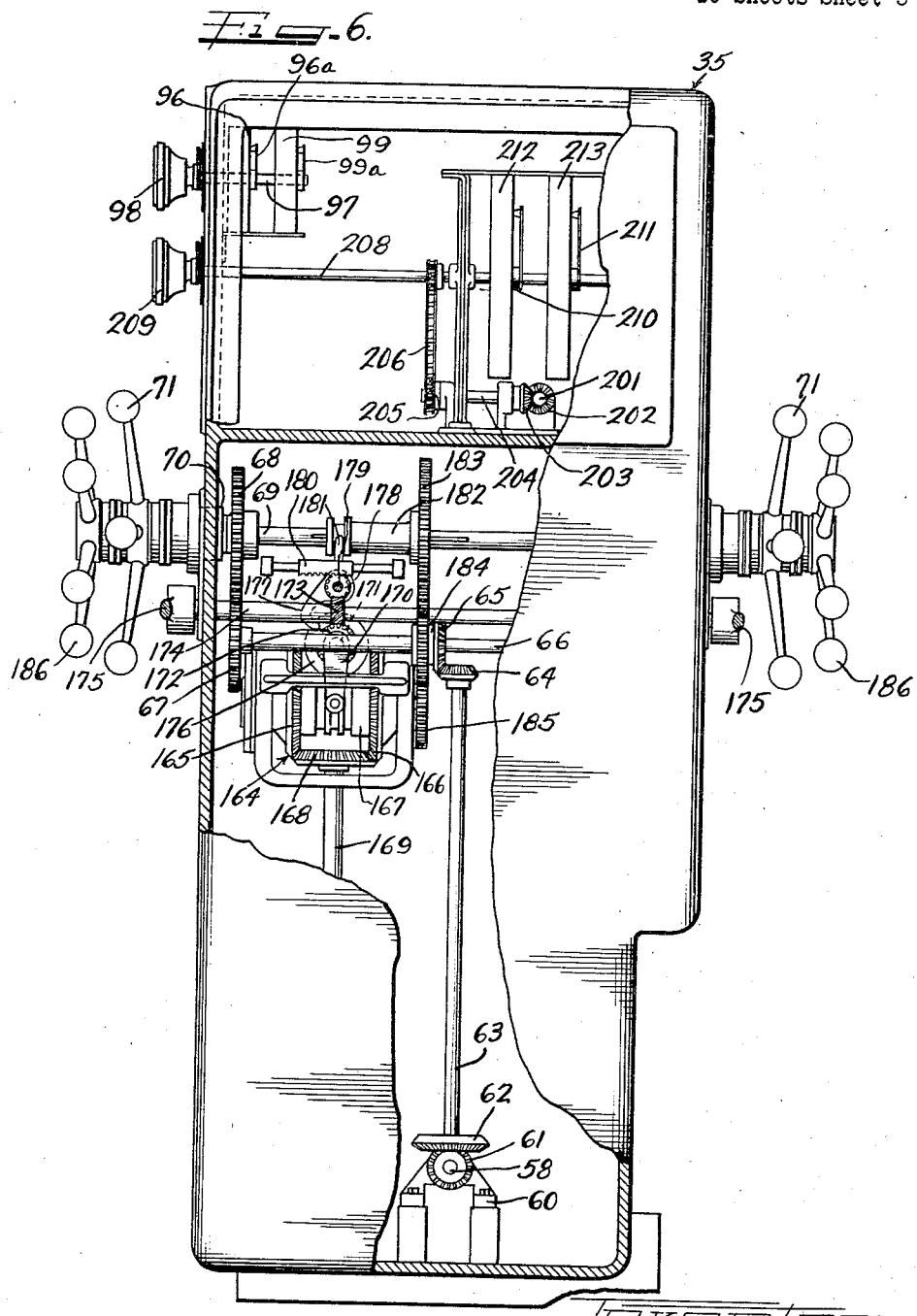

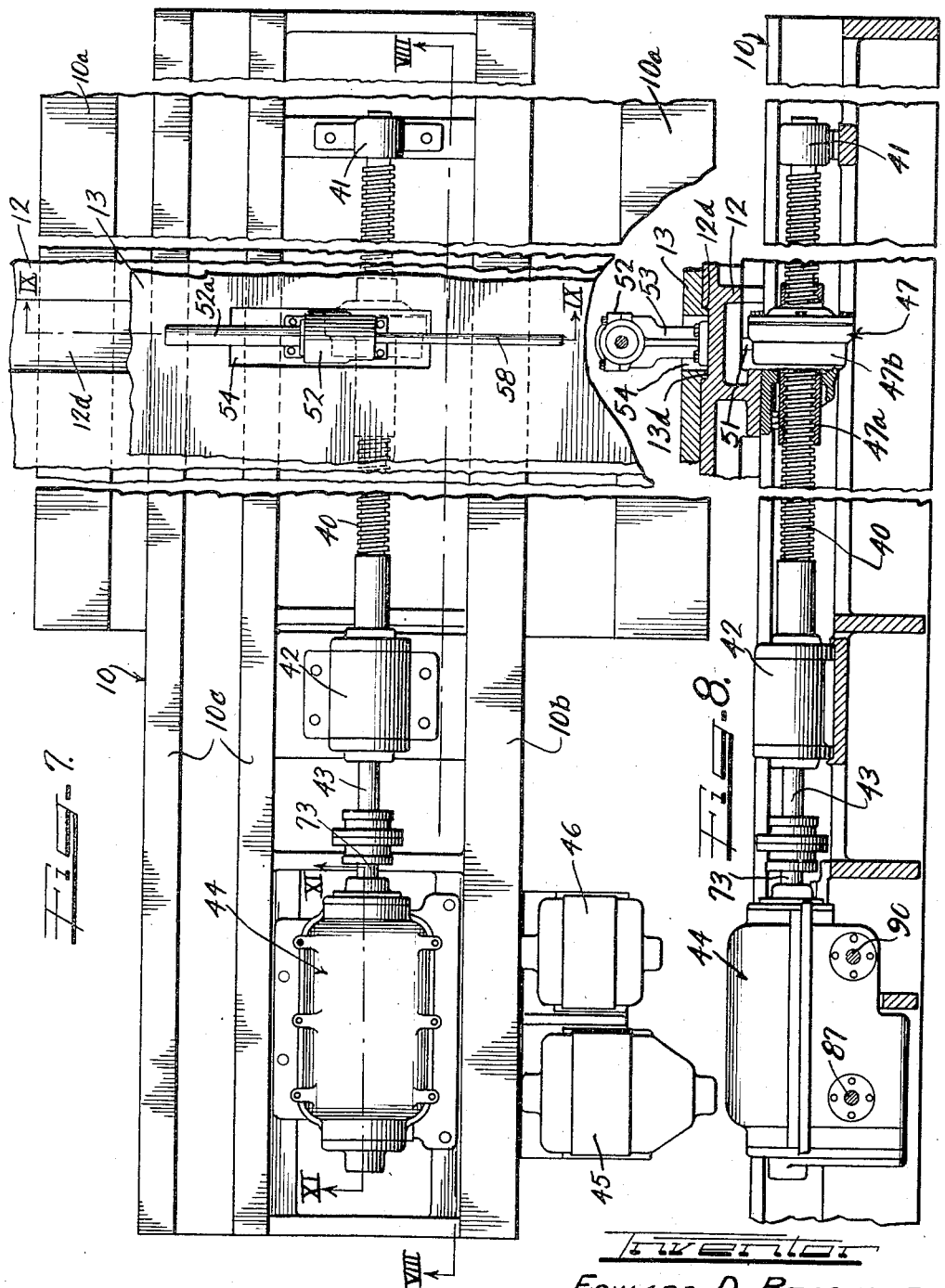

Oct. 12, 1948.  E. D. BEACHLER  2,451,147
ROTATING TOOL LATHE
Filed April 21, 1944  10 Sheets-Sheet 7
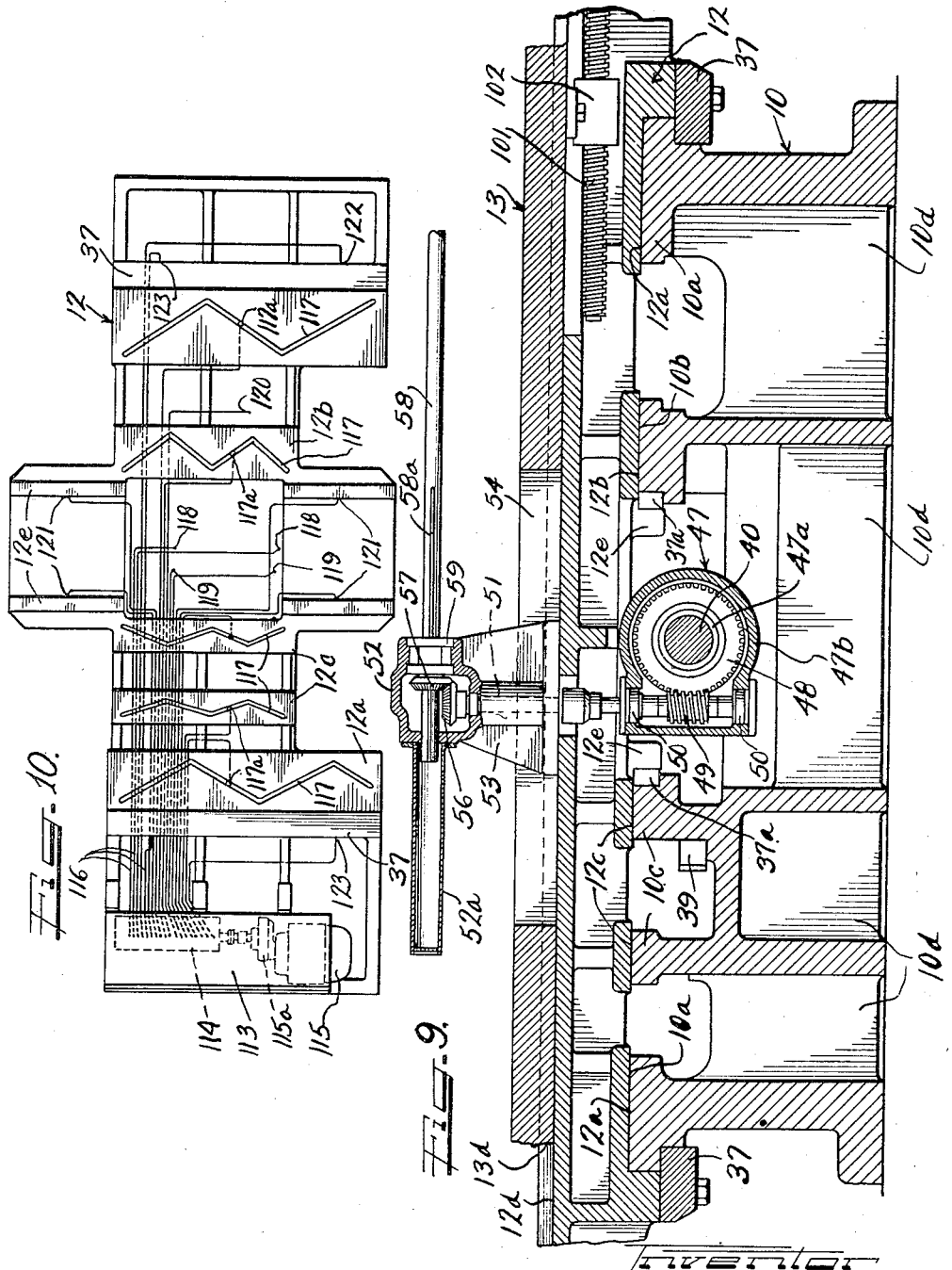
Inventor
EDWARD D. BEACHLER.
by Charles W. Hills Attys.

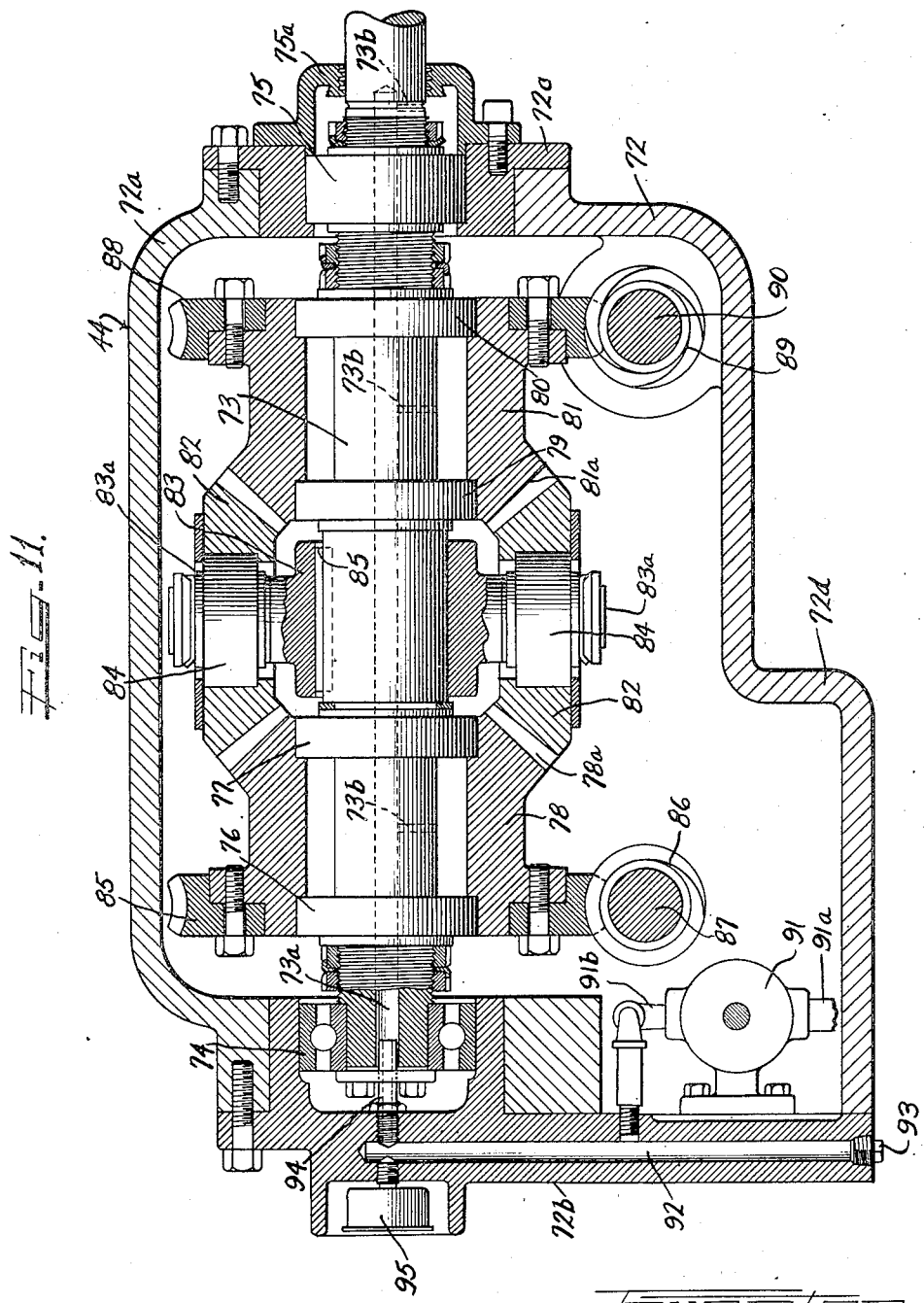

Oct. 12, 1948.    E. D. BEACHLER    2,451,147
ROTATING TOOL LATHE
Filed April 21, 1944    10 Sheets-Sheet 9

Inventor
EDWARD D. BEACHLER.
by Charles W. Hills Attys.

Oct. 12, 1948.  E. D. BEACHLER  2,451,147
ROTATING TOOL LATHE
Filed April 21, 1944  10 Sheets-Sheet 10
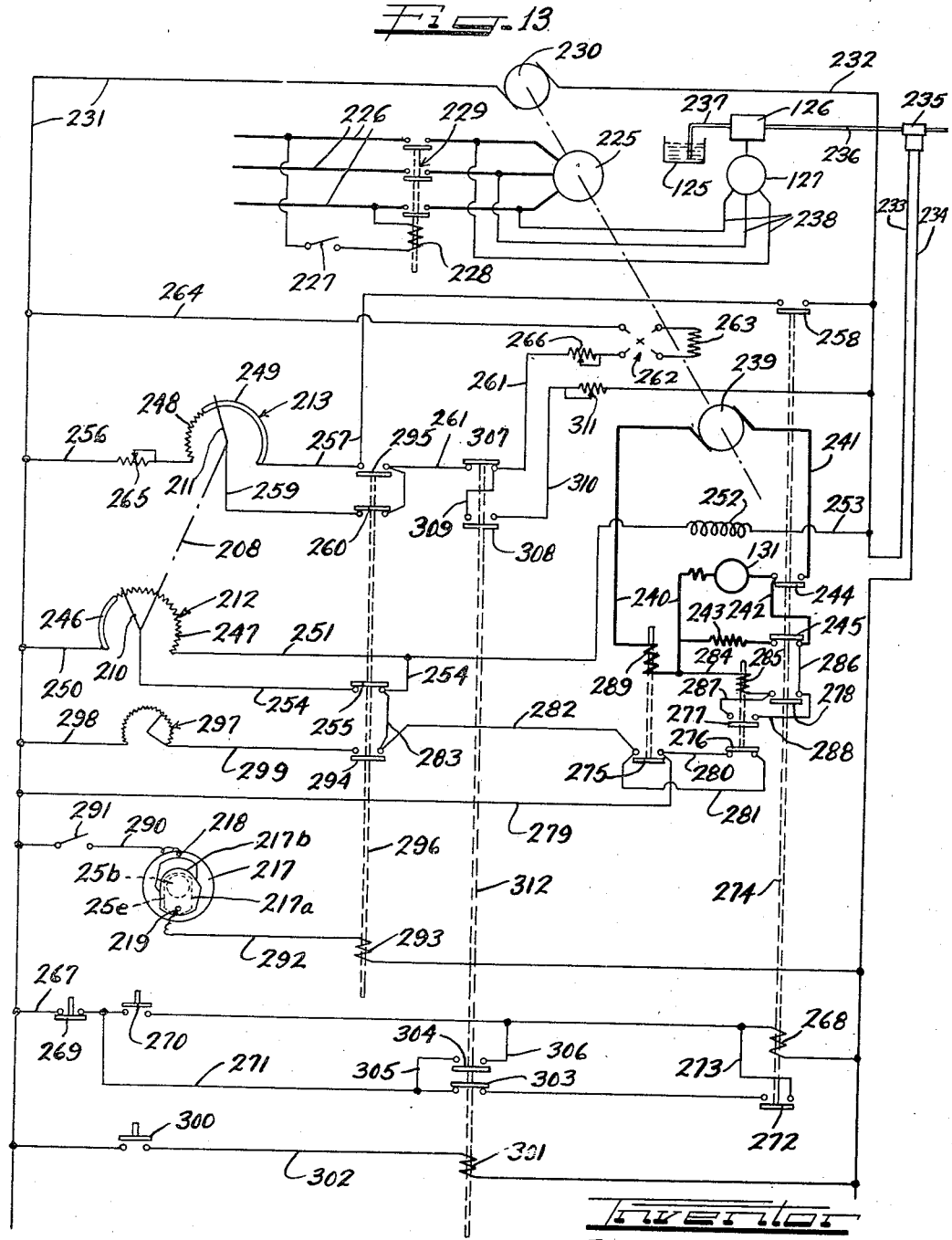
Inventor
EDWARD D. BEACHLER.
by Charles W Hills
Attys.

Patented Oct. 12, 1948

2,451,147

UNITED STATES PATENT OFFICE 2,451,147

ROTATING TOOL LATHE

Edward D. Beachler, Beloit, Wis., assignor to Beloit Iron Works, Beloit, Wis., a corporation of Wisconsin Application April 21, 1944, Serial No. 532,069

3 Claims. (Cl. 82—9)

This invention deals with machine tools of the rotating tool type and particularly relates to crank pin turning lathes.

In the copending application of Lloyd Hornbostel, Serial No. 530,371, filed April 10, 1944; entitled: "Rotary tool lathe," and now Patent No. 2,426,932, granted Sept. 2, 1947, there is described a crank pin turning lathe having a longitudinally and transversely adjustable housing supporting a rotating lathe ring which receives a crank shaft therethrough and slidably supports tool carriages for feeding cutting tools to cut the heels, cheeks and crank pins of the crank shaft.

The present invention now provides electrical and mechanical refinements for machine tools such as crank pin turning lathes of the type disclosed in said Lloyd Hornbostel Patent No. 2,426,932.

According to the present invention, a main bed is provided with tracks supporting a carriage for longitudinal movement. The carriage is floated on films of oil on the tracks. The carriage, in turn, slidably supports the main lathe ring housing for transverse movement across the bed. This ring housing is also floated on oil films on the carriage. The carriage is moved longitudinally on the bed by a longitudinal feed screw driven at slow feeding speed through a differential gear arrangement from a rheostat-controlled motor and driven at fast speed, for setting up purposes, by a rapid traverse motor superimposed on the aforementioned feed motor through the differential mechanism. The main bed also carries stanchions for fixedly supporting the crank shaft or other work piece through the main lathe ring which is rotatably mounted in the lathe ring housing. Additional standards can also be mounted on the bed outwardly from the stanchions to carry the extending ends of the crank shaft. The bed can be equipped with extensions on both ends thereof which cooperate with the tracks on the main bed itself so that the stanchions and the standards can be moved along the entire length of the bed. This arrangement makes it possible for the machine to act on crank shafts of any length since the extensions on the bed will accommodate positioning of the stands at proper intervals along the length of the crank shaft to accurately hold the shaft in position while it is being cut by the tools. In order to maintain a constant relative speed between the cutting tools and the crank shaft or other work piece, the machine of this invention has an automatic speed up arrangement which increases the rate of rotation of the main lathe ring as the cutting tools move inwardly toward the center of rotation and thereby act on surfaces spaced at smaller radial distances from the axial center line of the work. This automatic arrangement provides constant linear speed relationship between the tool and the surface acted on by the tool. In addition, the machines of this invention have automatic speed up devices which increase the speed of rotation of the main lathe ring whenever the tools are out of active engagement with the work, or are "cutting air." In the cutting of the heels and cheeks of crank shafts, the cutting tools are only in engagement with the heel and cheek surfaces for a relatively small increment of each complete rotation thereof, so that they are not effective for the major portion of each rotation. According to this invention, the time for heel and cheek turning operations is materially decreased by speeding up the tools much beyond an optimum cutting speed whenever they are out of contact with the work and then slowing the tools down to an optimum cutting speed when they contact the work.

It is, then, an object of this invention to provide machine tools accommodating work pieces of any length and capable of acting on such work pieces at any portion along the length thereof.

A further object of the invention is to provide a rotary tool lathe adapted to accurately lathe-finish the heels, cheeks, and pins of crank shafts within tolerance limits never heretofore attained, and at speeds heretofore considered impossible.

A still further object of the invention is to provide a crank shaft-turning lathe with a bed arranged to receive extensions accommodating crank shaft-holding standards at any portion along the length so that the machine will accurately hold and lathe-turn crank shafts of any length.

A still further object of the invention is to provide a crank pin-turning lathe with a bed accurately holding a carriage for longitudinal movement on films of oil.

A further object of this invention is to provide a longitudinal feed arrangement for the main lathe ring of a rotary tool lathe which accurately advances the lathe ring relative to the work at a desired speed and which can readily be driven at greatly increased speeds for setting purposes without affecting the selected feed speed.

A still further object of the invention is to provide a rotary tool lathe with a longitudinal feed screw drive on which is superimposed a rapid traverse speed drive to quickly set up the machine for use.

A still further object of the invention is to provide electrical controls for a crank pin-turning lathe which automatically increase the speed of rotation of the lathe as the tools feed inwardly toward a center of rotation.

Another object of the invention is to provide a rotary tool lathe which maintains a constant speed relationship between the lathe tool and the work surface acted on by the tool.

A still further object of the invention is to provide an automatic electric control device for crank pin-turning lathes which speeds up the rotation of the lathe whenever the lathe tool is out of contact with the crank shaft.

A still further object of the invention is to provide electric control means for rotary tool lathes which automatically increase the speed of rotation of the tool beyond an optimum cutting tool speed when the tool is out of contact with the work, and then automatically slow down the tool to an optimum cutting tool speed as it approaches the work while maintaining this optimum speed throughout the duration of contact of the tool with the work.

A further object of this invention is to provide a crank pin-turning lathe which materially decreases the time consumed for finishing the pins, heels, and cheeks of crank shafts.

Another object of the invention is to provide a crank pin-turning lathe with an electric "inching" device which positions the tool relative to the work.

A still further object of the invention is the provision of a crank pin-turning lathe carriage assembly floated on oil and adapted to be manually moved with ease by an operator so that it can be quickly set up in position for use.

Other and further objects of this invention will become apparent to those skilled in the art from the following detailed descriptions of the annexed sheets of drawings which, by way of preferred example only, illustrate one embodiment of the invention.

On the drawings:

Figure 1 is a top plan view of the crank pin-turning lathe.

Figure 2 is a side elevational view of Figure 1.

Figure 3 is a front end elevational view of Figures 1 and 2 on a larger scale.

Figure 4 is a rear end elevational view of Figures 1 and 2 on a larger scale.

Figure 6 is a fragmentary enlarged side elevational view, with parts broken away and shown in vertical cross section, and taken along the line VI—VI of Figure 1.

Figure 7 is a broken fragmentary plan view taken along the line VII—VII of Figure 2 and illustrating the parts on a larger scale than shown in Figure 2.

Figure 8 is a vertical cross-sectional view, with parts in side elevation, taken along the line VIII—VIII of Figure 7.

Figure 9 is a transverse vertical cross-sectional view, with parts in elevation, taken along the line IX—IX of Figure 7.

Figure 10 is a bottom plan view of the carriage for the main lathe ring housing and diagrammatically illustrating the lubrication arrangement for floating the carriage on films of oil.

Figure 11 is a vertical cross-sectional view taken along the line XI—XI of Figure 7 and illustrating the differential drive for the longitudinal feed screw on a larger scale.

Figure 13 is a wiring diagram for the main lathe ring and tool carriage drive.

As shown on the drawings:

The machine in general

Figure 5:
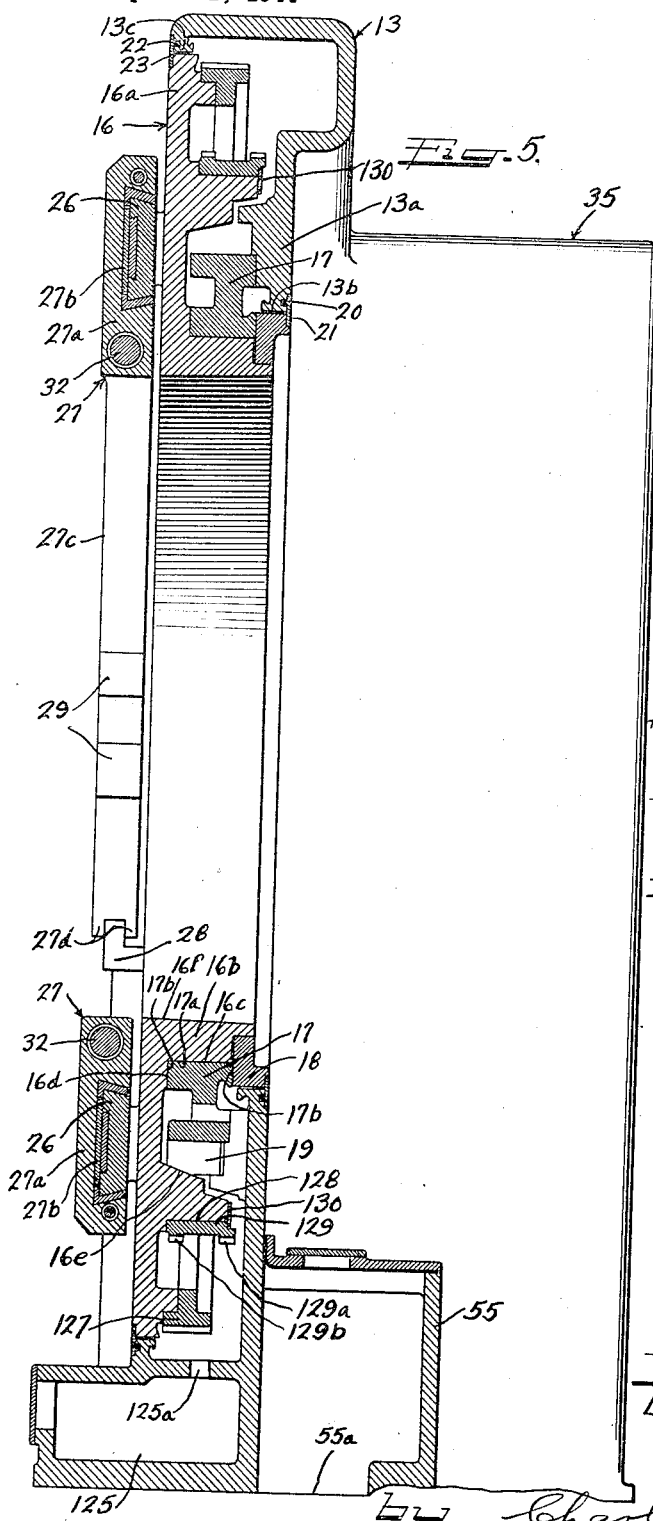
Figure 5 is a fragmentary enlarged vertical cross-sectional view, with parts in elevation, and with parts omitted, taken along the line V—V of Figure 1.

As shown in Figures 1 to 4, the machine includes a main bed 10 with extensions 11, 11 on the front and rear ends thereof. A main carriage 12 is longitudinally slidable on the main bed 10. A main lathe ring housing 13 is slidable on the carriage 12 transversely of the bed 10.

Work-supporting stanchions 14, 14 are slidable on the main bed 10 on opposite sides of the housing 13. Work-supporting standards 15, 15 are slidably mounted on the bed extensions 11, 11.

As best shown in Figures 3 to 5, the ring housing 13 has a back wall 13a with a circular aperture 13b therein together with a front wall defining a larger circular aperture 13c.

The main lathe ring 16 is rotatably mounted in the housing 13 and has a flat front face 16a fitting in the aperture 13c together with a central hollow hub portion 16b extending into the aperture 13b. The hub 16b has an outer peripheral cylindrical face 16c. A main bearing ring 17 is carried by the back wall 13a of the housing 13 and has an inner peripheral wall 17a receiving the face 16c of the hub in rotatable relation thereon. In addition, the ring 17 has side faces 17b, 17b projecting into the aperture 13b of the housing with one face thrusting against a shoulder 16d of the lathe ring 16 and the opposed face thrusting against an adjustable thrust ring 18 carried by the hub 16b. Adjustable shoes such as 19 act between the outer periphery of the bearing 17 and a tapered wall portion 16e of the lathe ring 16 to hold the hub wall 16c on the bearing wall 17a.

A seal ring 20 of rubber, felt or the like, is embedded in the back wall 13a of the housing around the periphery 13b to coact with a seal plate 21 carried by the thrust ring 18 for sealing the gap between this thrust ring and the wall defining the aperture 13b. Similarly a seal ring 22 is embedded in the front wall of the housing 13 around the aperture 13c to coact with a seal plate 23 carried by the front wall 16a of the lathe ring 16. The plate 23 bridges the gap between the lathe ring wall 16a and the wall defining the aperture 13c.

The lathe ring 16 has a central aperture 16f therethrough freely accommodating the crank shaft 25 or other work piece to be acted on by the machine as shown in Figures 3 and 4. The crank shaft 25 has main bearings 25a, connecting rod bearings or crank pins 25b, and webs 25c connecting the bearings 25a and pins 25b. The bearings 25a adjacent the pin or web portion being acted on by the lathe are clamped in the stanchions, 14, 14 on the front and back sides of the housing 13 while the extended portions of the crank shaft can have remote bearings 25a thereof resting on the standards 15, 15. Each standard 15 has a vertically adjustable head 15a that can be raised and lowered by means of a screw jack 15b so that it will be readily moved into supporting position.

Each stanchion 14, 14 has a head carrying removable blocks 14a in angular relationship for seating a bearing 25a. These blocks 14a are replaceable and are provided in sets of varying heights so that the crank shaft will be blocked up at the exact level desired for the turning operation. The heads of the stanchions 14 carry swing bolts 14b on which are slidably mounted a cap member 14c also carrying blocks 14a. Nuts on the swing bolts 14b can act on the cap 14c to draw the cap toward the head of the stanchion and tightly clamp the bearing for holding the crank shaft in rigid fixed position through the lathe ring aperture 16f. It will be noted from Figures 1 and 2 that the stanchions 14, 14 are movable on the bed 10 to position the clamping heads close to the aperture 16f of the lathe ring if desired, so that they can grip portions of the crank shaft immediately adjacent the portion being acted on by the lathe tools.

As shown in Figures 3 and 5, the front face 16a of the lathe ring 16 has parallel ways or gibs 26, 26 on diametrically opposed sides of the aperture 16f. These ways 26 are of dovetail cross section. Tool carriages 27, 27 have base legs 27a, 27a with dove-tail grooves 27b, 27b therein slidably mounted on the ways 26, 26. Each tool carriage 27 has a main leg 27c extending from one end of the base leg 27a in right-angular relationship therewith. The tool carriages 27 are thus of L-shaped configuration. The free end of the main leg 27c of each tool carriage is bifurcated as at 27d and this bifurcated end slides on a track 28 opposing the gib or way 26 so that the tool carriage will be mounted for steady accurate movement toward and away from the center of the lathe ring. The main leg 27c of each tool carriage, as best shown in Figure 3, has inwardly projecting tool-clamping jaws 29 receiving therebetween a tool holder 30 carrying a lathe tool 31. The lathe tools 31 are in diametrically opposed relationship and are fed toward and away from each other by movement of the tool carriages 27 on the ways 26 and tracks 28.

Tool carriage feed screws 32 have threaded relationship with nuts 33 removably carried by the carriages 27 for sliding the carriages on the tracks and ways. The feed screws 32 project into transmission housings 34 carried on the face 16a of the main lathe ring. As will be hereinafter more fully described, these housings 34 contain worm and worm wheel drives.

As shown in Figures 3 and 4 the main ring housing 13 has laterally projecting portions 35 and 36 on the sides thereof. As will be hereinafter more specifically described, the portion 35 provides a gear casing as shown in Figure 6, while the portion 36 provides a cabinet for electrical equipment.

As shown in Figures 1 to 4, a platform P₁ extends around the front side of the casing 35 and ring housing 13 to register with a platform P₂ extending along the front end of the ring housing from adjacent the rear side of the machine and a platform P₃ extending along the rear end of the housing from the rear side of the machine. The platform P₁ has a stairway S₁ depending therefrom into spaced relation from the floor. The platform P₂ has a similar dependent stairway S₂ while the platform P₃ has the same type of dependent stairway S₃. The platforms and their dependent stairways are all carried by the ring housing structure, and are movable therewith along the bed 10. The platforms give ready access to all of the operating controls of the machine and facilitate inspection of the lathe-turning operation.

From the above descriptions it will be understood that the machine has an elongated bed on which a carriage is slidably mounted carrying a housing assembly in transverse movable relation thereon. This housing assembly supports the main lathe ring receiving the work therethrough. The lathe ring carries one or more tool carriages which are fed radially inward or outward, as desired. The bed also slidably supports work-clamping stanchions on opposite sides of the ring housing together with work-supporting standards for carrying extended end portions of the work.

Work done by the machine

The crank pin-turning lathes of this invention cut, to accuracies not heretofore obtainable, the crank pin, the inside faces or cheeks of the webs between the pin and the main bearing, and the heels of the webs adjacent the main bearings, of crank shafts. These operations cannot be satisfactorily carried out on a conventional work-rotating lathe since, in such lathes, it is necessary to rotate the crank shaft about the center line of the pin being machined, and a lathe with an exceptionally large diameter swing would thus be required. Since crank shafts for marine engines and large stationary engines may have crank pins of several feet in diameter and a throw of 24 inches or more, it is apparent that the swing required for turning such large crank shafts on work-rotating lathes would be too large to be practicable. In addition, since the crank shafts must be rotated off center in a conventional lathe, a clumsy arrangement necessitating the use of counterweights and a special steady rest is required.

The crank pin-turning lathe of this invention avoids the problems encountered with the turning of crank pins in conventional rotary work lathes by holding the crank shaft stationary and rotating one or more cutting tools around the crank shaft. The machines of this invention are easily set up to accommodate crank shafts of widely varying size ranges, and will machine the crank shaft in one-half to one-fourth the time heretofore required while carrying out this rapid machining at tolerances within .001 inch, even on the largest size crank shafts.

Figure 14:
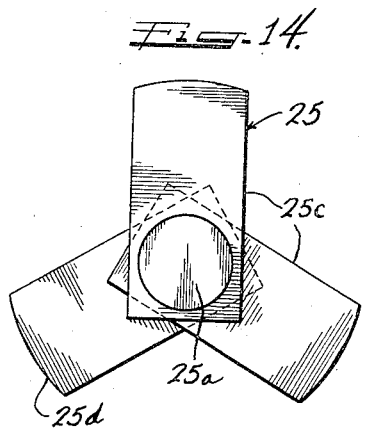
Figure 14 is an end elevational view of a crank shaft adapted to be lathe-turned by the crank pin-lathe of this invention.

In Figure 14 a rough crank shaft 25 is illustrated in end elevation. This shaft is initially formed from a forged billet that has slugs cut therefrom at spaced intervals along the length thereof and is twisted to position the crank pin-forming portions at the desired angular relationship around the main bearings. As shown in Figure 14, the crank shaft blank or starting work piece for the machines of this invention has main bearings 25a which have been lathe-turned to finished dimensions in a conventional rotating work lathe, since this turning operation is performed while rotating the work about its axial center. Webs 25c radiate in angular relationship from the main bearings 25a and carry the crank pins at their outer ends. The edges of the webs 25b have heels 25d which can also be finish-turned on the rotating work lathe, since they are equidistant from the axial center of the crank shaft. The inner ends of the webs, however, cannot have the heels thereof finish-turned on the conventional lathe without mounting the shaft in off-center position as described hereinabove. Therefore, the starting blank does not have the heels on the inner ends of the webs adjacent the main bearing 25a finished, nor does it have the cheeks or inner faces of these webs finished. Likewise, the crank pins themselves are not finished.

Figure 15:
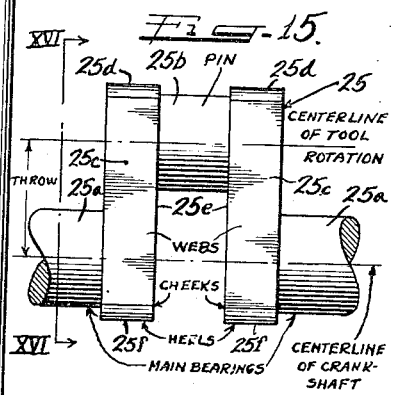
Figure 15 is a fragmentary side elevational view of the crank shaft of Figure 14.
Figure 16:
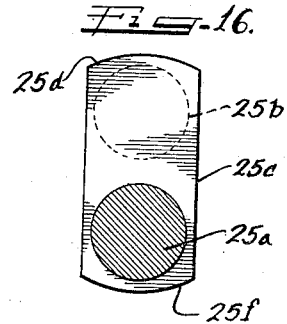
Figure 16 is a cross-sectional view taken along the line XVI—XVI of Figure 15 illustrating the crank shaft with the heels finished in accordance with this invention.

As shown in Figure 15, the crank shaft 25 has the crank pin 25b, the cheeks 25e, and the heels 25f finished by the crank pin lathe of this invention. These turning operations are finished to tolerances of even less than .001 inch in one-half to one-fourth the time heretofore required, and crank shafts of tremendous size can be accommodated because they are held stationary during these operations. Crank shafts from sixty to eighty feet in length and having crank pins two to three feet in diameter can be handled with ease.

As shown in Figures 3 and 4, the stanchions 14, 14 securely clamp the main bearing portions 25a, 25a on each side of the crank pin 25b and web 25c to be acted on by the machine. Since the ring housing 13 can be transversely moved on its supporting carriage 12, it is immaterial that the crank pin 25b to be acted on is off-center from the supporting stanchions, since the housing can be so positioned that the center of the crank pin will coincide with the center of the housing.

As indicated in Figure 15, the inside cheeks 25e of the webs 25b are readily finished-turned to accurate tolerances. The inside heels 25f are similarly finish-turned.

The machine bed construction

As best shown in Figures 1, 7 and 9, the main bed 10 has relatively wide flat-top tracks 10a, 10a on the front and rear sides thereof. A flat-topped track 10b is also provided on this main bed 10 in spaced parallel relation from the front side of the machine. This track 10b extends beyond the ends of the tracks 10a. A pair of closely spaced paralled tracks 10c having narrower flat tops is provided adjacent the rear side tracks 10a in spaced parallel relation therewith and extending longitudinally beyond the ends of this rear side track 10a to terminate flush with the track 10b.

All of the tracks are in integral relationship, being connected by webs 10d of the main bed as best shown in Figure 9.

The end beds 11, 11, as best shown in Figure 1, each have a track 11b aligned with the track 10b of the main bed and spaced parallel tracks 11c aligned with the spaced parallel tracks 10c of the main bed. The end beds 11, 11 are bolted or otherwise secured to the ends of the main bed 10 to position their tracks 11d and 11c in aligned relationship with the tracks 10b and 10c of the main bed.

As best shown in Figure 9, the main carriage 12 has flat pads 12a, 12a riding on the tracks 10a, 10a of the main bed, a pad 12b riding on the track 10b, and spaced parallel pads 12c riding on the tracks 10c.

Strips 37, 37 are bolted onto the carriage 12 to underlie the pads 12a, 12a and ride under the tracks 10a, 10a for holding the carriage down on the tracks. Ribs 12e, 12e depend from the pad 12b and the inner pad 12c to act on strips 37a inserted between the ribs and pad 10b and inner pad 10c to hold the carriage against sidewise movement on the bed.

As shown in Figures 3 and 4, the standards 15, 15 likewise slide on the tracks 11b and 11c of the end beds 11, 11. These standards 15 have bottom pads resting on the tracks together with attached end strips 38 riding under the outer tracks 11b and 11c for holding the standards down on the tracks. In order to prevent cocking of the standards, a portion 15d on the bottom of each standard extends between the tracks 11c.

A rack 39 is provided along the length of the inner track 11c adapted to be engaged by a spur gear 40 on a spindle 41 rotatably carried in the bottom wall of the standard 15. The spindle 41 can be engaged by an operating handle to rotate it for rotating the spur 40 and thus effecting longitudinal shifting of the standard.

The stanchions 14 are similarly mounted and similarly equipped with spur gears and rotating spindles for shifting the same. Both the standards and the stanchions can ride on either the tracks 10b and 10c of the main bed 10, or the tracks 11b and 11c of the end bed. If it is desired to move the stanchions or standards beyond the ends of the beds 11, 11 as shown in Figure 1, additional bed sections can be bolted onto these end bed sections for extending the length of the bed. Additional standards can also be used.

As shown in Figures 2, 7, 8, and 9, the top face of the carriage 12 has dove-tailed grooves 12d therein slidably receiving pads 13d of the main ring housing to slidably guide this ring housing transversely over the carriage 12. From the above description it will be understood that the bed for the machine of this invention has a plurality of tracks thereon slidably supporting the main carriage for the lathe ring housing as well as the supporting and clamping stanchions for the crank shaft.

The longitudinal drive

As best shown in Figures 1, 7 and 8, an elongated screw rod 40 is rotatably mounted at one end in a bearing 41 secured on a cross strap of the main bed 10 and is rotatably mounted in the other end in a combined bearing and coupling 42 carried by a cross strap or pad of the main frame. A drive shaft 43 from a differential 44 connects the screw 40 with the differential mechanism. This differential mechanism is driven by two motors 45 and 46 as will be hereinafter more specifically described.

The rod 40 is threaded through a casing 47 having an elongated nut 47a (Figure 8) rotatably journaled therein. The casing 47 depends from the carriage 12 and rotation of the screw rod 40 moves the nut 47a along the length thereof, as will be described, to drive the carriage 12 longitudinally on the bed 10.

As shown in Figure 9, the casing 47 has a central enlarged portion 47b. A worm wheel 48 is effectively threaded on the screw rod 40 in this enlarged casing portion 47b by being secured to nut 47a. Worm wheel 48 is engaged by a worm 49 mounted in bearings 50 carried by the casing and coupled to a shaft 51 extending through an aperture in the carriage 12 into a gear housing 52 on a pedestal 53 bolted to the bottom of a groove 12d on the top face of the carriage 12. The ring housing 13 has a rectangular aperture 54 in the base portion 13d thereof riding in this groove 12d. The aperture has its long axis transversely of the main bed 10 as shown in Figure 7.

The ring housing 13 has a transverse box-like portion 55 (Figure 5) extending across the rear face thereof at a level beneath the ring aperture, and this box has an open bottom 55a through which project the gear housing 52 and pedestal 53.

As shown in Figure 9, the upper end of the worm shaft 51 has a bevel gear 56 secured thereon in the gear housing 52. This bevel gear 56 meshes with a bevel gear 57 at right angles thereto which is slidably keyed on a transverse shaft 58 slidably projecting through a bearing 59 carried by a side wall of the housing 52. An elongated key 58a is secured along a portion of the length of the shaft inwardly from the end of the shaft. The housing 52 has a tubular extension 52a on the side wall thereof opposite the wall carrying the bearing 59, and this tubular extension 52a is adapted to receive the end of the shaft 58.

The shaft 58 extends through the housing 55 into the casing 35 on the front side of the ring housing as shown in Figure 6. As therein indicated, the shaft 58 is near the bottom of the casing 35 rotatably supported on a bracket 60 and having a bevel gear 61 secured to the end thereof. The bevel gear 61 meshes with a bevel gear 62 in right-angular relation thereto. The gear 62 is on the bottom of a vertical shaft 63 extending upwardly in the casing 35. The upper end of the shaft 63 has another bevel gear 64 thereon meshing with a bevel gear 65 keyed to a horizontal shaft 66 rotatably mounted in the casing. This shaft 66 has a gear 67 on the end thereof meshing with a gear 68 loosely disposed around another horizontal shaft 69 but secured to a hub 70 of a hand wheel 71 on the front end face of the casing. A similar hand wheel 71 is provided on the rear end face of the casing and its hub is geared to the shaft 66 in the same manner as just described.

Rotation of either hand wheel 71 will rotate a gear 68 meshing with the gear 67 on the shaft 66 to rotate the shaft 63 through the bevel gears 64 and 65. The shaft 63, in turn, rotates the shaft 58 through the bevel gears 61 and 62, and this shaft 58, as shown in Figure 9, when rotated, causes the key 58a thereon to drive the bevel gear 57 thereby rotating the gear 56 and worm shaft 51 to drive the worm 49 and rotate the worm wheel 48. Since the worm wheel 48 is effectively threaded on the screw rod 40 but is held against free lateral movement in the casing 47, and since this casing 47 depends from and is secured to the carriage 12, the carriage will be moved longitudinally on the main bed 10. When rod 40 is rotated by drive shaft 43, the nut 47a is held against rotation by worm 48, hence movement of casing 47 along the main bed again results.

From the above description, it therefore will be clear that rotation of either hand wheel 71 will cause longitudinal shifting of the carriage 12 and the ring housing on the carriage. As will be hereinafter more fully described, this heavy assembly can actually be moved by manual effort since the lubrication system so materially reduces friction that many tons can actually be slid on the main bed with a very small manual pull on a hand wheel.

The above-described manual longitudinal shifting of the carriage and main ring housing is brought about when the longitudinal feed screw 40 is at rest. This manual shifting is generally only used for slight adjustments of the longitudinal position of the cutting tools carried by the lathe ring. Longitudinal feeding of these cutting tools during the lathe-turning operation is effected by rotation of the feed screw 40 by driving the shaft 43 coupled to the feed screw with the differential mechanism 44. During rotation of the feed screw 40 the worm wheel 48 is not rotated, since the worm 49 holds it against rotation and the rod 40 merely turns through the stationary wheel. Thus, during driving of the feed screw, the hand wheels 71 are not driven.

As shown in Figures 1, 7 and 8, the differential mechanism 44 is mounted between the track 10b and the inner track 10c of the main bed 10 toward the front end of the bed.

As shown in Figure 11, the differential mechanism 44 comprises a main casing 72 with a removable cover 72a thereon, a cap 72b secured to the front wall thereof, and a cap 72c secured to the rear wall thereof. A main differential shaft 73 is rotatably mounted in the casing 72 on end bearings 74 and 75. The end bearing 74 is carried in a boss portion of the head cap 72b while the bearing 75 is carried in the cap 72c. Bearings 76 and 77 carry a hub member 78 freely around the shaft 73 adjacent the bearing 74 while bearings 79 and 80 carry a second hub member 81 freely around the shaft 73 adjacent the bearing 75. The hub member 78 has bevel gear teeth 78a on the rear end thereof while the hub member 81 has bevel gear teeth 81a on the front end thereof in spaced opposed relation to the teeth 78a. The teeth 78a and 81a respectively mesh with differential gears 82 carried from the legs 83a of a spider 83 on bearings 84. The spider 83 is keyed to the shaft 73 by means of a key 85 between the bearings 77 and 79.

A worm wheel 85 is bolted to the front end of the hub 78 and meshes with a self-locking flat angle worm 86 on a shaft 87 coupled to the electric motor 45.

The rear end of the hub 81 has a worm wheel 88 bolted thereon meshed with a multi-thread or steep worm 89 on a shaft 90 coupled to the motor 46. This motor 46 is equipped with an automatic brake (not shown) which locks the shaft 90 whenever the motor is deenergized so that the worm 89 will prevent the worm wheel 88 and hub 81 from rotating.

The casing 72 has a sump 72d in the bottom thereof for containing lubricating oil. A pump 91 is bolted on the front cap 72b and has an inlet 91a receiving oil from the sump 72d together with an outlet 91b discharging into a duct 92 in the cap 72b. This duct 92 can be drilled in the cap and it is closed at its bottom end by means of a plug 93 and communicates at its upper end with a tube 94 fitting freely into a longitudinal bore 73a through the differential shaft 73. The duct 92 also communicates with a pressure gauge 95 threated in the cap 72b.

Bleeder passages 73b lead from the longitudinal bore 73 at intervals along the length of the bore to bleed lubricant to the bearings and gears in the casing. The rear end bearing 75 is protected with a seal 75a bolted on the cap 72 and having close-running clearance with the projecting portion of the differential shaft 73.

The pump 91 will force lubricant through the tube 94 into the longitudinal bore 73a. Some of the lubricant will bleed out of the front end of this bore to lubricate the bearing 74 while additional lubricant will bleed through the bleeder passageways 73b to lubricate the bearings and gears. The lubricant after passing over the gears and bearings is again collected in the sump 72d for recirculation.

Rotation of the worm 86 by the motor 45 when the worm 89 is locked, as when the motor 46 is deenergized and the brake thereon applied, will cause rotation of the hub 78 and rotation of this hub will tend to rotate the differential gears 82 because of the meshed relationship therewith. However, the hub 81 is held against rotation by the worm 89 and will prevent rotation of the differential gears 82. Therefore, the hub 78 will drive the spider 83 to cause rotation of the differential shaft 73 at a speed determined solely by the speed of the motor 45. Rotation of the shaft 73, of course, drives the coupling shaft 43 and the screw rod 40 to effect longitudinal sliding of the carriage 12 on the main bed 10 thereby controlling the longitudinal feed of the lathe tools. The motor 45 is a D. C. motor energized by the generator of a motor-generator set. The speed of the motor 45 is controlled by variation of resistance in its field as by means of a rheostat 96 (Figure 6) in the upper end of the casing 35 of the main ring housing and by variation of resistance in the field of the energizing generator by means of a second rheostat 99. The rheostat arm 96a is secured on a shaft 97 controlled by a manually-operated knob 98 on the front end face of the casing. The second rheostat 99 has the arm 99a thereof on the same shaft 97 but arranged so that the resistance will be successively applied to the two fields. A wide speed range for motor 45 is thus obtained.

The motor 46 is an A. C. constant speed motor for rapid traverse driving. Driving of the motor 46 will rotate the hub 81 thereby tending to rotate the differential gears 82. However, if the motor 45 is stationary, the hub 78 will be locked and the gears 82 cannot rotate. In such cases, the motor 46 will be effective to drive the spider 83. This rapid traverse motor 46 is used for initial positioning of the carriage along the length of the bed, as when setting up the machine for use. In such cases, it is desirable to move the ring housing to approximately its operating position as rapidly as possible. Then the manual-controlled hand wheels 71 can be used to gently move the ring housing into its exact desired longitudinal position.

During the lathe-turning operation, the motor 45 alone drives the longitudinal feed screw 40 at a selected rate, determined by the settings of the rheostats 96 and 99, for advancing the tools longitudinally.

The rapid traverse motor 46 can be driven when the feed motor 45 is operating to cause an additive driving effect on the differential shaft 73 so that rapid longitudinal shifting can occur between the slow feeding operations. If one motor is driven in a direction opposite to the direction of the other driving motor, the feed screw will be driven at a speed equivalent to the differences in speeds of the motors and in the direction determined by the faster motor.

The control knob 98 is thus effective to maintain exact longitudinal feed speeds for the feed screw and the rapid traverse motor 46 can be superimposed on the motor 45 or can be driven alone for the initial setting of the longitudinal position of the ring housing. A very wide range of operating speeds is obtained.

From the above descriptions it will be understood that the longitudinal drive of the lathe includes both a motor drive and a manual drive. The motor drive has a driving motor, a rapid traverse motor, and a differential gear assembly driven by either one or both of the motors. The controls for the motor drive and the manual drive are conveniently located on the same gear casing 35.

*The transverse positioning mechanisms*

As explained hereinabove, the base of the ring housing 13 slides on the top of the carriage 12 and has ways or gibs 13d projecting into complementary grooves 12d in the carriage 12. In order to initially position the ring housing 13 relative to the work so that the lathe ring 16 will rotate about the desired center, the carriage 12, as shown in Figures 2, 3 and 4, has a gear housing 100 secured thereon. The housing 100 contains a worm wheel on a shaft 101 (Figure 9) threaded through a nut 102 depending from the base of the ring housing 13. A worm (not shown) on a shaft 103 (Figures 2 and 3) meshes with the wheel in the casing 100 and a hand wheel 104 is secured on one end of this shaft 103 for manual rotation of the worm to rotate the shaft 101 and cause the ring housing 13 to slide on the carriage 12. A rapid traverse motor 105 is coupled to the other end of the shaft 103 and can be energized to drive the worm mechanically for the sliding of the ring housing on the carriage.

The rectangular aperture 54 in the base of the ring housing receiving the pedestal 53 and gear housing 52 therethrough accommodates transverse movement of the ring housing as indicated in Figure 9.

As shown in Figure 3, the exact transverse position of the ring housing relative to the longitudinal center of the bed is readily determined by a scale 106 on the ring housing base, and a pointer 107 on the front end of the carriage 12.

Quick and accurate transverse setting of the ring housing on the carriage can be accomplished by providing a bracket 108 on the ring housing base with a stop 108a axially aligned with an opposed stop 107a on the finger. A rod exactly equal in length to the desired distance for displacing the center of the lathe ring 16 from the axial center of the bed is then inserted between the two stops 108a and 107a and the hand wheel 104 or the motor 105 is manipulated until this rod just snugly fits between the stops. If a rod of the desired length is not available, as, for example, when setting the machine to accommodate an unusual type of work piece, a second stop 107b on the finger 107 acts through a sliding rod 109 carried in brackets 110 on the carriage 12 to actuate the accurate dial gauge 111 also carried on the bracket 108. This dial gauge 111 can cooperate with the scale 106 to give micrometer readings.

From the above descriptions it will be understood that the rapid traverse motor 105 and a hand wheel 104 selectively rotate a shaft 103 for driving a worm and worm wheel to actuate a screw rod for positioning the ring housing transversely on the carriage. This transverse setting must be very accurate since it determines the center about which the lathe tools operate and a gauge assembly is provided on the carriage and ring housing base to indicate the exact transverse setting of the ring housing.

*The lubrication system*

As shown in Figure 3, the carriage 12 at the side thereof opposite the side having the hand wheel 104 thereon has dependent brackets 112 providing a platform 113 for a lubricator 114 and an electric motor 115 for driving this lubricator. The lubricator 114 is of the positive pressure plunger type and has a hand crank 114a on the front face thereof for manually actuating the same in the event it is desired to pump lubricant without operating the motor 115.

As best shown in Figure 10, the motor 115 drives the lubricator 114 through reduction gears in a casing 115a. A timer is also provided (not shown) for stopping driving of the motor 115 after a predetermined period so that the lubricator 114 will not flood the lubricated surfaces. A plurality of oil tubes 116 extend from the lubricator 114 to various parts of the carriage 12. The pads 12a, 12b, and 12c of the carriage have lubricant-distributing grooves 117 therein arranged in reverse diagonal fashion along the length of the pads and opening onto the bed tracks on which the pads ride as hereinabove described for distributing lubricant to the tracks. As shown, each groove 117 has a connection 117a with a lubricant-conveying tube 116.

Some of the tubes terminate at the center of the carriage as at 118 to drip oil onto the longitudinal feed screw 40. Other tubes 116 terminate as at 119 to drip oil into the nut gear casing or box 47. A tube 116 is positioned as at 120 to drip oil onto the transversing nut 102 for moving the ring housing 13. Other tubes are positioned as at 121 to supply oil to the ribs 12e. Other tubes are positioned as at 122 to lubricate the strips 37.

This oiling arrangement provides for the actual floating of the carriage 12 on films of oil on the bed so that movement of the carriage is readily effected with only very little frictional resistance, and an assembly weighing as much as thirty to fifty tons can actually be shifted by manual movement of the hand wheel 71.

The grooves 12d on top of the carriage likewise receive lubricant from the tubes 116 to lubricate the gibs or ways 13d for facilitating transverse movement of the ring housing 13. The tubes 123 can feed these grooves 12d as at 123 (Figure 10).

The lubrication of the main bed for easy movement of the carriage 12 is effected automatically whenever the rapid traverse motor 46 is running since the motor 115 will be started at the same time. However, a timer (not shown) is provided so that the lubrication will continue for at least a predetermined period even though the rapid traverse motor stops short of that period. This insures sufficient oiling and prevents flooding of the lubricated surfaces. The oil from the lubricator 114 is not recirculated since it is of an adhering nature tending to remain on the ways and tracks to float the carriage and housing on films of oil, and only small amounts of oil are necessary.

The oil lubricator is not operated throughout the longitudinal feeding stroke as when the motor 45 only is running since this motor only drives at slow feed speeds and sufficient oil is provided from the rapid traverse operations to last through the feeding operations.

In order to keep the ways and tracks clean and at the same time to seal the oil film between the sliding surfaces, felt seals 124 (Figure 3) are provided on the carriage to rub on the tracks. Similar felt seals 124 can be provided on the leading ends of other lubricated parts such as on the end faces of the ring housing base.

As shown in Figure 5, the ring housing 13 has an oil reservoir-defining portion 125 communicating as at 125a with the main lathe ring. The main lathe ring is lubricated through tubing discharging into the ring housing 13 and an oil pump 125 (Figure 3) driven by another electric motor 127 (Figure 4) is provided for forcing lubricant into the ring housing through these tubes. The excess oil drains into the reservoir 125 and is returned for recirculation to the pump.

From the above descriptions it will be understood that the lathe ring parts are lubricated by an oil system which includes recirculation of oil by an electric motor-driven oil pump. The longitudinal movement of the carriage on the main bed, and the transverse movement of the ring housing on the carriage are facilitated by another lubrication system which does not involve recirculation of oil and which utilizes a separate motor and a plunger type lubricator.

*The gear drives for the lathe ring and tool carriages*

Figure 12:
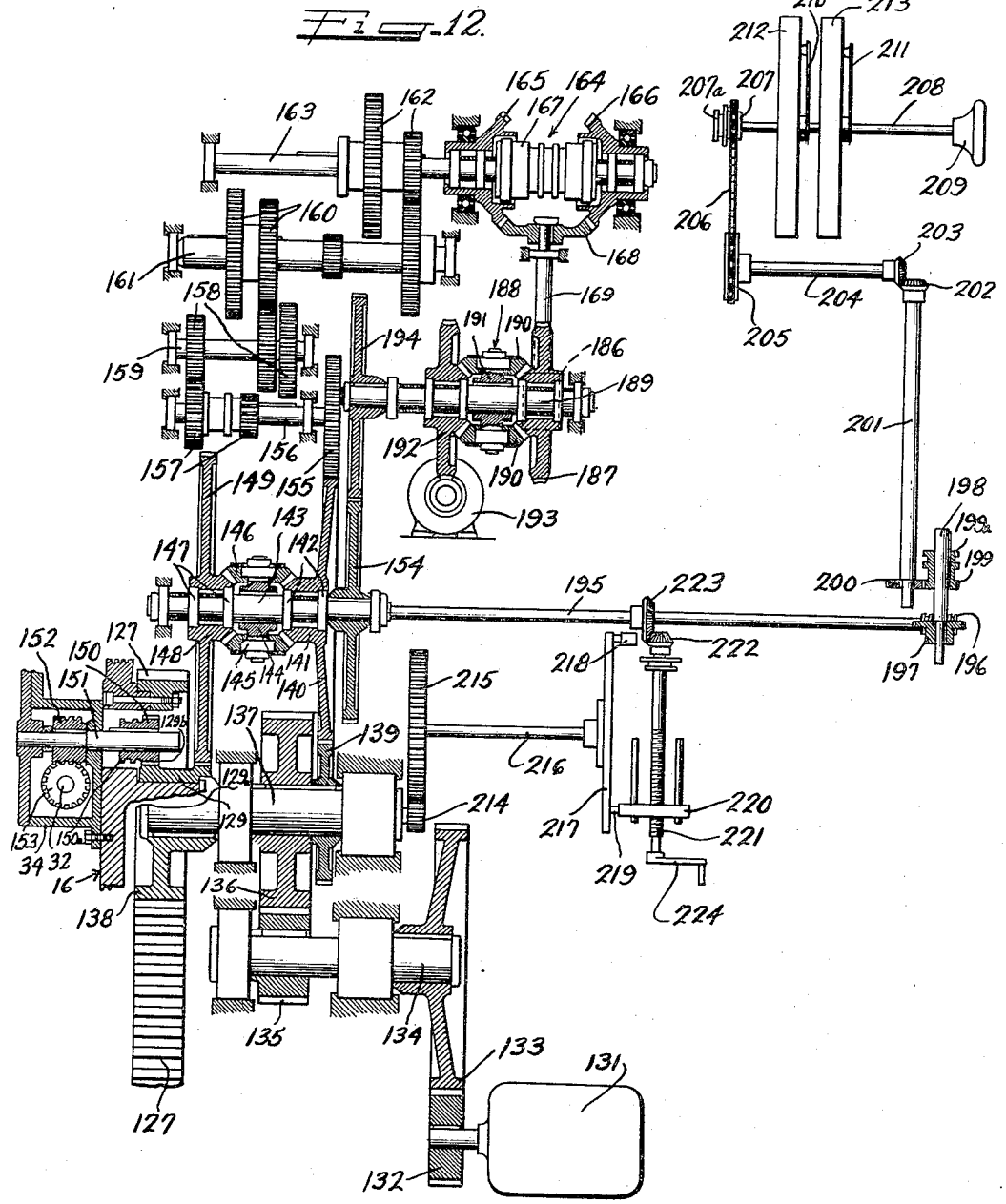
Figure 12 is a somewhat diagrammatic gear-drive assembly for rotating the main lathe ring at controlled selected speeds and for sliding the tool carriages relative to the main lathe ring.

As shown in Figure 5, the lathe ring 16 has a main ring gear 127 secured thereon around the inside face thereof near the outer periphery. This ring gear 127 is fixed to the lathe ring 16 by bolts or other securing devices (Figure 12).

The lathe ring 16 has a cylindrical wall or pilot portion 128 therearound radially inward of the ring gear 127. A second ring gear 129 is rotatably mounted on this pilot portion 128 and is held thereon by means of plates such as 130. This second ring gear 129 has a double row of teeth 129a and 129b therearound.

As shown in Figures 1, 2 and 4, a large motor 131 is mounted on the rear end face of the casing 35. This motor drives the main lathe ring 16. As shown in Figure 12, the motor 131 drives gear 132 meshing with a gear 133 on a shaft 134. This shaft 134 has a gear 135 thereon driving a gear 136 on a shaft 137. The shaft 137 carries a gear 138 meshing with the ring gear 127 for driving the ring gear.

The shaft 137 also drives a second gear 139 meshing with a gear 140 having a hub 141 rotatably mounted on bearings 142 disposed around a differential shaft 143. This differential shaft has a spider 144 keyed thereon rotatably supporting differential gears 146 on bearings 145. The shaft 143 also has a second set of bearings 147 thereon rotatably supporting the hub 148 of a second gear 149. This gear 149 meshes with the teeth 129a of the rotatably mounted ring gear 129 on the pilot portion 128 of the main lathe ring 16. The teeth 129b of this same ring gear 129 mesh with a gear 150 clutch keyed as at 150a on a stub shaft 151 which is rotatably mounted in the casing 34 bolted on the front face of the lathe ring 16. A worm 152 is disposed in this casing 34 keyed on the shaft 151 and meshes with a worm wheel 153 for driving the tool carriage feed screw 32.

The gear 140 driven by the gear 139 from the drive shaft 137 has gear teeth on its hub 141 meshed with the differential gears 146 to rotate these gears on the spider 144. However, the hub 148 of the gear 149 also has meshed engagement with the same differential gears 146, and if the differential shaft 143 is held stationary the differential gears will rotate on the spider 145 to drive the hub 148 and gear 149 in a direction opposite to the direction of rotation of gear 140 but in the same direction as the direction of rotation of the gear 138 driving the ring gear 127. The gear 149 will thus rotate the ring gear 129 in the same direction as the ring gear 127 and the gear ratio is such that no relative rotation occurs between gears 127 and 129. With ring 129 rotating in the same direction and at the same speed as ring 127, gear 150 is not driven and the tool carriages do not move.

While the motor 131 is effective to drive the tool carriage feed screws 32 as well as the main lathe ring, as explained the lathe ring can be driven and the feed screws will not be driven unless the shaft 143 is rotated. For this purpose, a gear 154 is keyed on the differential shaft 143 and a gear 155 meshes with the gear 140.

The gear 155 drives a shaft 156 on which a plurality of gears 157 are slidably keyed. The gears 157 selectively mesh with gears 158 on a shaft 159 and these gears 158, in turn, selectively mesh with sliding gears 160 on another shaft 161. The shaft 161 drives sliding gears 162 on a shaft 163.

As shown in Figure 3, gear shifting rods A, B, and C are provided for selectively sliding the gears 157, 160, and 162 on their respective shafts to drive the shaft 163 from the shaft 156 at any one of a large number of speed ratios. A gear shift arrangement is thus provided which can be selected by relative positions of the shifting levers A, B and C to give a wide selection of speed ratios between the shafts 156 and 163.

The shaft 163 drives a reversing clutch 164 containing opposed bevel gears 165 and 166 adapted to be selectively driven by a shiftable member 167 slidably keyed on the shaft 163 or a shaft coupled with the shaft 163. The bevel gears 165 and 166 both mesh with a common bevel gear 168 keyed to the shaft 169.

If the sliding member 167 is shifted to drive the gear 165, the shaft 169 will be driven in one direction. If the member 167 is moved to engage the gear 166, the shaft 169 will be driven in the reverse direction.

As shown in Figure 6, the shifting of the clutch member 167 to selectively engage the gears 165 and 166 to place the clutch in neutral position is accomplished by a yoke 170 on a rock shaft 171 in the gear casing 35. A gear 172 on the shaft 171 meshes with a skew gear 173 on a shaft 174 projecting through the front and rear end faces of the casing 35. Operating handles 175 are secured on the projecting ends of the shaft 174.

In order to lock the clutch 164 in neutral position, viz., with the member 167 out of engagement with both gears 165 and 166, the shaft 171 has a notched locking plate 176 thereon adapted to receive a finger 177 in the notch thereof to prevent the shaft from rotating and cause the yoke 170 to hold the shifting member 167 in neutral position.

The finger 177 is keyed on a lock shaft 179 having a gear 178 thereon. A rack 180 is actuated by the gear 178 and has a yoke 181 thereon acting on collars of a sliding gear hub 182 which is slidably keyed on the shaft 69 referred to hereinabove. A gear 183 secured to the hub 182 is meshed with a gear 184 which is loose on the shaft 66, and this loose gear 184, in turn, is meshed with a gear 185 on the hub of the clutch gear 166.

Hand wheels 186 dispose in aligned outward relationship from the hand wheels 71 on the end walls of the gear casing 35 are secured to the shaft 69 and are effective for rotating this shaft. Rotation of the shaft 69 will rotate the gear 183 and if this gear 183 is meshed with the gear 184 the gear 185 will be driven to rotate the clutch gear 166 and thereby actuate the shaft 169 manually. However, the gear 183 is only meshed with the gear 184 when the clutch 164 is locked in neutral position. This is accomplished by manual rocking of the lock shaft 179. If the tilting levers 175 are tipped for shifting the yoke 170 to cause the clutch member 167 to engage a gear 165 or 166, the shaft 179 must first be rocked to unlocked position to unlock the finger 177 permitting the yoke member 170 to move and at the same time the gear 178 on this lock shaft 179 will be driven to move the rack 180 for sliding the hub 182 to move the gear 183 out of meshed engagement with the idler gear 184.

Therefore, manual actuation of the shaft 169 from a hand wheel 186 can only take place when the clutch is locked in neutral position. In this position the handles 175 are horizontal.

As shown in Figure 12, the shaft 169 has a worm 186 thereon meshed with the worm wheel 187 of another differential assembly 188. The worm wheel 187 is freely rotatable about the differential shaft 189 and is meshed with differential gears 190 on a spider 191 keyed to the differential shaft. These differential gears 190 are also meshed with a second worm wheel 192 freely rotatable around the differential shaft 189. A rapid traverse motor 193, for a purpose to be more fully hereinafter described, is meshed with the worm wheel 192.

The differential shaft 189 has a gear 194 keyed thereon and meshed with the gear 154.

As explained hereinabove, the tool carriage feed screw 32 will only be driven when the gear 149 drives the ring gear 129 at a different rate than, or in an opposite direction to, the ring gear 127 and this can only be acomplished when the shaft 143 is driven to drive the spider 144 and add to the speed of the gear hub 141 in driving the gear hub 148 or to reverse the direction of rotation of the hub 148 by driving the shaft 143 in the opposite direction. This shaft 143 can be driven at a desired selected speed by the speed changer devices or gear shifts interposed between the gear 142 and the reversing clutch 164. The reversing clutch can drive the second differential 188 in opposite directions for rotating the shaft 143 at a speed relative to the speed of the gear 140 determined by the setting of the gear changer and in a direction determined by the setting of the clutch. When the motor 193 is not energized, it holds the worm wheel 192 against rotation so that rotation of the worm wheel 187 by the shaft 189 is effective to rotate the spider 191 and drive the differential shaft 189 at the speed determined by the shaft 169.

The feed screw 32 of the tool carriage is thus driven inwardly or outwardly, depending upon the position of the clutch 164 and at a speed ratio relative to the lathe-rotating speed which is selectively predetermined by the setting of the levers A, B and C of the gear-shifting mechanism. The main ring motor 131 thus not only drives the ring 16 to rotate the tool carriages, but it also drives the feed screws of these tool carriages radially inward or radially outward at rates having selected ratio differentials from the rate of rotation of the lathe ring. Thus the lathe ring can be rotated very rapidly and the tool carriages can have a very slow radial feed. Conversely, the lathe ring can be rotated at relatively slow speeds and the tool carriages can have relatively high radial feed speeds.

If it is desired to rapidly change the radial positions of the tool carriages, the rapid traverse motor 193 can be energized to drive the worm wheel 192 and cause rotation of the spider 191 for driving the differential shaft 189 at high speed. The rapid traverse motor will shift the carriages at a rapid rate radially inward or radially outward, even though the main lathe ring is not turning. The rapid traverse motor 193 also shown in Figures 1, 2 and 3, is a desirable electrical drive for quick setting of the radial positions of the tool carriages prior to lathe-cutting operations.

While only the drive for one feed screw 32 has been described and illustrated in Figure 12, it should be understood that the other feed screw 32 for the other tool carriage 27 is driven in an identical manner by merely duplicating the gear 150, shaft 151, worm 152 and worm wheel 153. The second gear 150 will be diagonally opposite the illustrated gear 150 in Figure 12 meshed with the same row of teeth 129b on the movable ring gear 129.

Since it is sometimes desirable to manually adjust the radial positions of the tool carriages, the hand wheels 186 are provided to manually drive the shaft 169. However, as explained hereinabove, the clutch-actuating lever 175 must be in horizontal neutral position and the clutch must be locked in neutral position before these hand wheels 186 are effective. When the clutch is engaged, as when the levers 175 are tilted for radial infeed or outfeed of the tool carriages, the gear 183 is out of engagement with the gear 184 and the hand wheels are freely rotatable without driving the clutch. This safety feature is desirable so that the hand wheels 186 will not rotate when the tool carriages are being mechanically driven.

In order to maintain a constant speed relationship between the cutting tools and the surfaces being cut, the lathe ring is speeded up as the tool carriages are moved radially inward. For this purpose, the differential shaft 143 is coupled to a shaft 195 (Figure 12) having a worm 196 on the end thereof driving a wheel 197 on a shaft 198 which shaft has a sliding gear 199 thereon actuated at 199a to be meshed with a gear 200 on a shaft 201. The shaft 201 extends into the top part of the casing 35 as shown in Figure 6, and is connected through bevel gears 202 and 203 with a jack shaft 204 having a sprocket 205 on the end thereof driving a chain 206 and a sprocket 207 on a slip clutch 207a secured to a rheostat control shaft 208. This rheostat control shaft 208 projects through the front end face of the casing and has a control knob 209 on the projecting end thereof. Rheostat arms 210 and 211 are secured on the shaft 208 in the casing 205 and act on rheostats 212 and 213, respectively. As will be hereinafter explained, setting of the knob 209 determines the initial speed of rotation of the lathe ring 16, and if the slide gear 199 is in engagement with the gear 200 to drive shafts 201 and 204, the sprocket chain 206 will drive the rheostat shaft 208 to increase the speed of the lathe ring as the tool carriages are driven inwardly at a rate determined by the differential shaft 143 which shaft also determines the rate of movement of the shaft 195 and the connecting shafts to the rheostat shaft 208. The arrangement is such that rotational speed of the lathe ring increases in proportion to the decrease in length of torque arm between the carriage tools and the center about which these tools are rotating.

In order to decrease the time for cutting surfaces which do not have continuous contact with the lathe tools for a complete 360° of rotation of these tools, the lathe ring is arranged so that it is speeded up whenever the tools move out of contact with the work and is slowed down just immediately before the tools recontact the work. This control is accomplished automatically by providing a gear 214 on the shaft 137. The gear 214, as shown in Figure 12, meshes with a gear 215 driving a shaft 216 having a plate 217 on the end thereof for carrying replaceable templates corresponding to the shape of the surface being cut. As shown in Figure 13, the plate 217 has a template 217a thereon for the cutting of a cheek 25e of the crank shaft 25 described hereinabove. As indicated in dotted lines, the cheek 25e does not have the exact shape of the template and lies within the confines of the template in spaced relation from its edges. This over-sized template shape is designed to cause a slowing down of the tool immediately before it hits the cheek surface so that the tool will not be subjected to a sudden shock. The template 217a, as indicated in Figure 13, has an inverted portion. This portion is provided when two tools 31 are being used since the lathe ring 16 must be slowed down twice and speeded up twice for each revolution thereof when two tools are used.

The plate 217 is replaceable on the shaft 216 to carry different shaped templates corresponding with the type of work surface to be acted on. The plate is of current-conducting material while the template insert 217a thereon is of insulating material. A fixed brush 218 acts on the plate and a movable brush 219 rides on and off the template 217a. The brush 219, as shown in Figure 12, is mounted on a carrier 220 threaded on the screw rod 221 driven through bevel gears 222 and 223 from the shaft 195. The handle 224 is provided for manual rotation of the rod 221 to initially set the radial position of the brush 219 with relation to the template 217a. The shaft 195 is driven when the tool carriages are fed radially as explained hereinabove, and drives the screw rod 221 to move the brush 219 in accordance with the radial position of the tools. As will be hereinafter more fully described, the electrical arrangement is such that the drivng of the lathe ring is speeded up whenever the brush 219 rides out of contact with the template 217a and is slowed down whenever the brush rides on the template. This speeding up and slowing down control functions simultaneously with the radial speed-up of the tool ring as the tool carriages move radially inward.

From the above descriptions it will be understood that the motor 131 drives the main lathe ring 16 through a gear train including the fixed ring gear 127 on the main lathe ring. It will also be understood that the tool carriages are driven radially inward or radially outward by the same motor 131 driving the lathe ring 16 at a selected proportional speed determined by setting of gear shift rods A, B and C of a gear change mechanism and in a direction determined by a reversing clutch mechanism 164 actuated by a tilting rod 175. A rapid traverse motor 193 can be superimposed on the motor 131 for changing the radial position of the tool carriages as desired independently of the motor 131.

Automatic devices are provided for speeding up the rotation of the lathe ring as the tool carriages move radially inward for maintaining a constant surface speed relationship between the tools and the surface being acted on. Additional automatic devices are provided for speeding up the rotation of the lathe ring whenever the tools leave contact with the work piece, and for slowing down rotation of the lathe ring whenever the tools recontact the work piece.

The electrical controls

In Figure 13 there is shown a simplified wiring diagram illustrating the electrical control for salient parts of the apparatus. In this wiring diagram, all circuit closing devices or switches except certain manually operable switches which will be specifically referred to, are relay actuated and for convenience will be referred to hereinafter as contacts.

In general, the control of the motor 131 driving the main lathe ring 16 is effected through a motor-generator set, and the speed of this main ring drive motor is controlled by voltage variation in the generator field and current variation in motor field. Low speed operation of the lathe ring 16 is controlled by varying the voltage to the generator field, and higher speed operation of this lathe ring is controlled by varying the current in the motor field. Circuit means are also provided for alternately speeding up and slowing down the main ring drive motor during cheeking and heeling cutting operations. In addition, circuit means are provided for "inching" the main ring to facilitate setting of the cutting tools, and this "inching" may be accomplished in both forward and reverse directions. The electrical circuit governing the operation of the main ring drive motor 131 is associated with the oil pump 126 in such manner that the drive motor 131 is inoperative until after the oil pressure has reached a predetermined value.

Referring to Figure 13, an alternating current motor 225 is energized through conductors 226 of any suitable source of alternating current supply. A manually operable switch 227 effects a closing or opening of the circuit through control of a relay 228 governing the actuation of a contactor arrangement generally indicated by numeral 229. By a common shaft connection the motor 225 drives a direct current exciter 230 which meets line conductors 231 and 232.

As a safety factor, the circuit through these line conductors is open until an adequate oil supply for the mechanism is provided. In the illustrated instance, line conductor 232 is open until the circuit is closed through conductors 233 and 234 by way of an oil pressure switch generally indicated by numeral 235 associated with the main oil line 236 leading to the ring bearing 17. Oil is supplied to the line 236 from the sump 125 through line 237 by means of the oil pump 126 mechanically driven by the pump motor 127 energized by way of suitable conductors 238 from the aforesaid conductors 226. The conductors 238 are, of course, connected to the conductors 226 on the main motor side of the contact arrangement 229. Thus, when the control switch 227 is closed, the motor 225, exciter 230 and pump motor 127 are all in operation. However, the voltage supply from the exciter is not effective until the oil pressure has reached a predetermined amount sufficient to close the oil pressure switch and thus complete the circuit through conductors 233 and 234.

A direct current generator 239, also mechanically driven by the main motor 225 through the common shaft connection, supplies voltage by way of conductors 240 and 241 to the armature of the lathe ring drive motor 131. Shunted across the motor armature by conductor 242 is a dynamic braking resistance 243. The feed circuit from the generator 239 to the motor 131 is controlled by a contact 244 governing the circuit through conductor 241, and the dynamic braking circuit is controlled by a contact 245 governing the energization of conductor 242. The contacts 244 and 245 are simultaneously actuated so that when the circuit is closed between the generator and the motor, contact 245 opens the dynamic braking circuit, and when the generator supply circuit is opened by contactor 244, contact 245 closes the dynamic braking circuit. It will therefore be appreciated that when it is desired to stop operation when the generator supply circuit is open, the lathe ring drive motor 131 will tend to function as a generator and the counterelectromotive force set up by the motor will energize the dynamic braking circuit to effect very quick stopping.

The speed of the motor 131 is controlled by rheostats 212 and 213 above mentioned. The rheostat 212 is a motor field rheostat and the rheostat 213 is a potentiometer rheostat controlling the voltage to the generator field. The arms 210 and 211 of these rheostats are on the same shaft 208, as explained above. This arrangement provides the constant cutting speed in linear feet per minute as the cutting tool or tools reduces the diameter of the work. The rheostat shaft 208 can be adjusted manually, regardless of the mechanical drive connection, by means of the slip clutch 199a. Since both the rheostat arms move together, certain portions of these rheostats are blanked out. As shown, rheostat 212 embodies a solid conductor portion 246 and a resistance portion 247, while the rheostat 213 includes a resistance portion 248 and a solid conductor portion 249, the resistance portion 248 being substantially equal in arcuate length to the solid conducting portion 246, and the solid conducting portion 249 being similarly equal to the resistance portion 247. The arrangement is such that, assuming the rheostat arms are operated clockwise, low speed variations are effected by the portion 248 of the potentiometer rheostat 213 through the generator field, and higher speeds are selectively acquired by means of the resistance portion 247 of the motor field rheostat 212.

The resistance element of the motor field rheostat 212 is connected to line conductor 231 by conductor 250 at one end and at the other end is connected through conductor 251 to the motor field 252, which is in turn connected by conductor 253 to line conductor 232. The arm 210 of this rheostat 212 is connected by conductor 254 to conductor 251 through a normally closed contact 255.

The resistance element of the potentiometer rheostat 213 is connected to line conductor 231 by conductor 256 at one end, and at the other end through conductor 257 to line conductor 232, normally open contact 258 controlling the energization of this portion of the circuit. The arm of this rheostat is connected by conductor 259 embodying a normally closed contact 260, and then by way of conductor 261 to a reversing switch generally indicated by numeral 262 and to one side of the field 263 of the generator 239. The other side of the generator field is connected through the reversing switch and a conductor 264 to the positive line conductor 231. Certain voltage controls are incorporated in the generator field circuit to establish fixed limits of control over the operation of the ring drive motor 131. For example, a variable resistance 265 is included in conductor 256 on the positive side of the potentiometer rheostat 213 and this resistance may be adjusted to provide a definite minimum speed of the motor 131 by establishing a minimum voltage which is applied to the generator field at all times. Another variable resistor 266 is included in the conductor 261 and this resistor may be adjusted to give the maximum voltage desired from the generator. Between these minimum and maximum limits, low speed operation of the motor 131 may be selectively effected through a predetermined range by the resistance portion 248 of the element of rheostat 213, the position of the rheostat arm upon this element determining the voltage supply to the generator field and thus determining the voltage supplied by the generator to the armature of motor 131. Beyond this predetermined low speed range, selective speed control in a higher predetermined range may be had by way of the resistance portion 247 of the element of rheostat 212, the position of the arm of this rheostat determining the amount of current passing through the motor field, and as this arm is turned clockwise more resistance is cut into the motor field circuit and the speed of the motor correspondingly increased.

Energization of the above described circuit involving the generator 239 and ring drive motor 131 is governed by a start and stop arrangement including a conductor 267 connecting line conductor 231 with line conductor 232 through a relay 268. This conductor 267 includes a stop button 269 and a start button 270. The stop button is normally urged to circuit closing position and acts to open the circuit through the conductor when pressed. The start button is normally in open position and acts to close the circuit through the conductor 267 when pressed. From a point between the start and stop buttons a conductor 271 extends to one terminal of a contact 272, the other terminal of which is connected by a conductor 273 to the conductor 267 on the positive side of the relay 268. When the start button is pressed to close the circuit through conductor 267, relay 268 is energized and closes contact 272. As soon as contact 272 is closed, the start button may be released and relay 268 will continue to be energized by virtue of current flowing through conductor 271, contact 272 and conductor 273. When the stop button is pressed, the circuit is broken, deenergizing relay 268.

As indicated by the dotted line 274, the energization of relay 268 simultaneously causes the closing of contact 272 and opening of contact 245, thus cutting out the dynamic braking circuit, the closing of contact 244 establishing circuit connection from the generator 239 through the armature of the ring drive motor 131, and a closing of contact 258, closing the feed circuit for the generator field 263 through potentiometer rheostat 213. The motor 131 will then operate under the control of the rheostat arrangement including the rheostats 212 and 213, assuming that the oil pressure has been built up sufficiently to close the circuit through conductors 233 and 234.

A safety arrangement is provided to prevent injury to the lathe ring drive motor 131 both when started and stopped. This arrangement, in the illustrated instance, includes four contacts 275, 276, 277 and 278. A conductor 279 connects the line conductor 231 with one terminal of the contact 275 and this same terminal is connected by a conductor 280 to the opposite terminal of contact 276. The other terminal of contact 276 is in turn connected to the remaining terminal of contact 275 by conductor 281, and this same terminal is connected by conductor 282 to a conductor 283 which is connected to the aforesaid conductor 254 at a terminal of contact 255. With conductor 254 connected to conductor 251, it is therefore apparent that at the time of start of operation, the contact 276 being normally closed, the motor field rheostat 212 is shorted out of circuit and full field current is permitted to pass through the motor field 252 so that the motor will begin operating at a low speed. When operation is started, simultaneously with the closing of the motor armature circuit by contact 244, contact 278 closes a circuit across the motor armature which circuit includes a conductor 284 embodying a relay 285 and a conductor 286 leading to the aforesaid conductor 242. If the potentiometer rheostat 213 is set so as to provide full generator voltage, the relay 285 will operate at a predetermined percentage of that voltage. The operation of this relay will close the holding circuit around contact 278 through conductors 287 and 288 by means of contact 277. Contact 276 is also controlled by the relay 285, and operated simultaneously with contact 277 to open the aforesaid circuit that up to that time had shorted out the motor field rheostat 212.

The contact 275 is controlled by a relay 289 in the generator feed conductor 240. This relay is set to operate when a predetermined value of current through the feed circuit to the motor armature is reached. Assuming that the rheostat arrangement is set in its full clockwise position, thus providing minimum current through the motor field, as soon as the current through the motor armature builds up to a predetermined extent, relay 289 acts to close contact 275 and again short out the motor field rheostat by way of conductors 279, 282, 283 and 254 to put full current through the motor field. When the motor slows down as a result of this full field current, the current of the motor armature circuit will drop below the predetermined value and the relay will release the contact 275, again cutting in the motor field rheostat 212. In short, the relay 289 opens and closes contact 275 at the start of operation to determine the accelerating torque of the motor and protect it during acceleration to high speed operation.

As before stated, while the motor 131 is operating contact 277 is held in closed position, and contact 276 remains open. When the stop button 269 is pressed to cease operation, the motor 131 immediately begins to function as a generator and full current should not flow through the motor field at that time. A counter-electromotive force develops in the motor 131, energizing the relay 285 until this counter-electromotive force has dropped below a predetermined value and then the relay 285 releases contacts 277 and 276 and the original circuit shorting out the motor field rheostat is closed by contact 276.

For alternating speeding up and slowing down the motor 131 during cutting of the cheeks 252 of the crank shaft 25, a circuit arrangement is provided which includes a conductive disk 217 rotated in synchronism with the lathe ring as described above. The disk 217 carries the template 217a of non-conductive material and shaped generally in keeping with the work piece, but being made proportionately larger so as to allow time for the circuit changes to take effect and to avoid tool impact shocks. The fixed brush 218 rides the surface of the disk 217 outside the rims of the template 217a and this brush is connected to line conductor 231 by means of conductor 290 which includes a manually operable control switch 291. The other brush 219 is positioned to alternately ride over the template 217a and the disk 217, and this brush is connected by means of conductor 292 to line conductor 232. Conductor 292 includes a relay 293 which, when energized, causes simultaneous movement of a normally open contact 294, the aforesaid normally closed contacts 255 and 260, and a normally open contact 295, all of which are connected mechanically as indicated by the dotted line 296. When contact 294 closes it establishes a circuit including a manually operable speed limiting rheostat 297 the element of which is connected at one side to line conductor 231 by a conductor 298, and the arm of which is connected at the other side by conductor 299 to a terminal of the contact 80. This rheostat 297 is brought into parallel circuit connection with the motor field rheostat 212 by means of conductors 283, 254 and 251. This rheostat 297 is initially manually adjusted and remains in that position of adjustment, so as to give a maximum operating speed to the machine.

The opening of the contact 260 cuts out of circuit the arm of the potentiometer rheostat 213, and the closing of contact 295 establishes circuit connection betweeen conductors 257 and 261 to apply full voltage to the generator field 263. When it is desired to use this automatic speed control, the switch 291 is closed. However, as long as the brush 219 rides the insulated template 217a, which is while actual cutting of the work occurs, the relay 293 cannot be energized, and the machine operates as above described with the motor speed determined by the setting of the rheostat arrangements including rheostats 212 and 213. When the brush 219 rides off the template 217a onto the disk 217 which corresponds to the time the cutting tool starts "cutting air," relay 293 is energized and actuates contact 255 to open the circuit through the arm of the field rheostat 212, and closes contact 294 to cut the adjusted speed limiting rheostat 297 in the motor field circuit in parallel with the full resistance of the rheostat 212 thereby lowering the current through the motor field 252 to a minimum value determined by the setting of the rheostat 297. At the same time, the relay opens contact 260, breaking the circuit through the arm of the potentiometer rheostat 213, and closes contact 291 to put full voltage through the generator field 263, also aiding in the quick acceleration of the motor. The motor then operates at the high speed determined by setting of the rheostat 297 until the brush 219 again rides onto the template 217a, when relay 293 is deenergized, thus restoring the contacts 294, 255, 260 and 295 to original position and the motor speed is governed by the setting of the rheostats 212 and 213. It will be noted that the template 217a is divided as indicated at 217b, both portions of the template being used when two cutting tools are operated, and only one portion of the template being used when one cutting tool is operated. Consequently, when both tools are in operation and a full template is used, the motor is accelerated twice and decelerated twice during a single revolution of the lathe ring.

Whenever it is desired to align, realign, or properly center the cutting tools, the so-called "inching" arrangement is brought into play to jockey the lathe ring 16 relatively to the work piece. By this arrangement, the motor 131 may be operated, repeatedly if so desired, for a very short interval of time. The arrangement includes a push button control 300 which controls the flow of current through a relay 301 in a conductor 302 connected across the lines 231 and 232. This relay 301 must cause energization of the main relay 268 controlling the contacts 278, 245, 244 and 253 in the motor and generator circuits, and must accomplish this independently of the starting button 270. To this end, the contact 303 is provided in the conductor 271 to open the circuit to contact 272 and prevent continued energization of the relay 268 until the stop button 269 is operated. At the same time, a contact 304 closes the circuit through conductors 305 and 306 between conductors 267 and 271 on the relay side of the starting button 270 to cause energization of the relay 268. Simultaneously with this operation a contact 307 opens the generator field circuit in conductor 261 to cut out the potentiometer rheostat 213, and a contact 308 closes a circuit through conductors 309 and 310 to energize the generator field circuit independently of the disconnected potentiometer rheostat 213. The generator field is then energized from the positive line conductor 231 through conductor 264, reversing switch 262, and conductors 261, 309 and 310 to the negative line conductor 232. If so desired, a safety adjustable resistor 311 may be included in the conductor 310 and set at a predetermined value. As indicated by the dotted line 312, contacts 303, 304, 307 and 308 are actuated simultaneously by the relay 301.

Consequently, when it is desired to "inch" the lathe ring 16, it is a simple expedient to quickly press and release the control button 300, and by virtue of the relay 301 and the contacts associated therewith, the main motor and generator circuits will be closed by means of relay 268, and the generator field will be energized independently of the potentiometer rheostat 213. Operation of the motor 131 will continue for the period of time the button 87 is held in closed position, and immediately cease when the button is released. If it is desired, to "inch" the lathe ring in the opposite direction, the operator need only move the handle of the reversing switch 262 to the opposite position, and utilize the same "inching" button 300 as before.

It will be appreciated that in connection with the above described circuit arrangement, all manually operable switches including the reversing switch 262, the manually adjustable rheostat 297, the conductor disk 217 with its template 217a, and the start, stop and "inching" buttons will preferably be located in a convenient arrangement on an easily accessible instrument panel on the casing 36.

Summary

The above descriptions show that the invention provides a machine tool especially adapted for accurately turning the pins, cheeks and heels of crank shafts which are stationarily held. The machine includes a bed which accurately holds a carriage for longitudinal movement. The carriage, in turn, accurately supports a housing for transverse movement. Both the carriage and the housing are floated on oil films, so that sliding movements are unimpeded even though the parts are held together in snug fit relationship to maintain accurate tolerances.

The housing rotatably carries a lathe ring. The front face of the lathe ring slidably supports a pair of tool carriages. The tool carriages are driven radially inward and outward.

Mechanism is provided for selectively proportioning the radial feed of the tool carriages relative to the rotating feed of the lathe ring. Suitable change gear transmissions are provided for this purpose.

Automatic devices are also provided for speeding up the rotation of the lathe ring as the tool carriages move inwardly so that a constant linear tool speed relative to the work will be maintained. In operations which involve contact of the tools with the work for only part of each revolution of the tools, such as cheeking and heeling operations, the lathe ring is automatically speeded up whenever the tools leave the work, and is automatically slowed down immediately before the tools recontact the work. This materially decreases the time necessary for such turning operations.

The longitudinal feeding of the carriage on the main bed is accomplished by a differential drive from a plurality of motors so arranged that a wide selection of very accurately controlled speeds is possible.

Electric controls are provided so that the lathe ring can be "inched" for jockeying the tools into position, as when setting up the machine. Reverse "inching" is also provided.

Manual controls are provided for both longitudinal and transverse setting of the ring housing, and these manual operations are accomplished with ease because of the oil films supporting the carriage and the housing.

Manual controls are provided for driving the tool carriages, and a safety device is arranged so that the manual devices cannot be operated unless the mechanical drives are disengaged.

The machines of this invention can accommodate crank shafts of tremendously large size and the lathe-turning operations are accomplished in one-half to one-quarter the time heretofore required. Tolerance limits of very low order are maintained with ease.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a rotary tool lathe, a lathe bed, a carriage slidable on said bed, a nut secured on said carriage, a screw rod threaded through said nut, a worm wheel threaded on said screw rod, means carried by said carriage holding said worm wheel against shifting movement on the screw rod, a worm for rotating said wheel, manual means for rotating said worm to shift said carriage, and mechanical means for rotating said screw rod to shift said carriage.

2. A rotary tool lathe comprising a bed, a carriage slidable on said bed, a lathe ring housing slidable on said carriage, a nut secured on said carriage, a casing associated with said nut, a worm wheel rotatably mounted in said casing, a screw rod rotatably mounted on said bed threaded through said nut and said worm wheel, mechanism on said bed for rotating said screw rod to feed the carriage on the bed, a worm engaged with said worm wheel, a drive shaft for said worm projecting through the carriage and through an elongated aperture in the base of said ring housing, a bevel gear on the upper end of said shaft, a gear housing encasing said bevel gear, a second bevel gear meshing with the first mentioned bevel gear rotatably mounted in said housing, a shaft slidably keyed to said second bevel gear, and a hand wheel for manually rotating said shaft to drive said worm wheel for manually advancing the carriage on the bed.

3. A rotary tool lathe comprising a bed, a carriage slidable longitudinally on said bed, a housing slidable transversely on said carriage, said housing having an elongated aperture in the base thereof, said carriage having an elongated aperture in the top thereof, a nut depending from the base of said housing through said aperture in said carriage, a screw rod threaded through said nut for shifting said housing transversely on said carriage, a gear housing on said carriage projecting through said elongated aperture in the base of the housing, meshed right-angular gears in said gear housing, a shaft extending through said lathe housing slidably keyed to one of said gears in said gear housing, a worm shaft secured to the other of said gears, a gear casing depending from said carriage rotatably mounting said worm shaft, a worm on said shaft in said casing, a worm wheel meshed with said worm in said casing, a longitudinal feed screw threaded through said casing and through said worm wheel, means rotatably mounting said feed screw on said bed, mechanism for rotating said feed screw to longitudinally advance said carriage, and hand-actuated means for rotating said shaft slidably keyed to said gear for manually advancing said carriage.

EDWARD D. BEACHLER.

REFERENCES CITED

The following references are of record in the file of this patent:

UNITED STATES PATENTS

| Number | Name | Date |
| --- | --- | --- |
| 572,709 | McClellan | Dec. 8, 1896 |
| 790,519 | Moll et al. | May 23, 1905 |
| 1,293,611 | McCarty | Feb. 4, 1919 |
| 1,333,043 | Steinle et al. | Mar. 9, 1920 |
| 1,368,755 | Roddey | Feb. 15, 1921 |
| 1,946,839 | Cole | Feb. 13, 1934 |
| Re. 19,448 | Johnson | Feb. 5, 1935 |
| 2,060,437 | Harley | Nov. 10, 1936 |
| 2,125,118 | Lips | July 26, 1938 |
| 2,172,999 | Hoelscher | Sept. 12, 1939 |
| 2,375,172 | Arter | May 1, 1945 |